United States Patent
Kato et al.

(10) Patent No.: US 10,324,750 B2
(45) Date of Patent: Jun. 18, 2019

(54) COMPUTER SYSTEM, COMPUTER SYSTEM MANAGEMENT METHOD AND PROGRAM

(71) Applicant: Hitachi, Ltd., Tokyo (JP)

(72) Inventors: Yutaro Kato, Tokyo (JP); Toshiyuki Hasegawa, Tokyo (JP); Nobuyuki Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 695 days.

(21) Appl. No.: 14/770,639

(22) PCT Filed: Nov. 18, 2013

(86) PCT No.: PCT/JP2013/080972
§ 371 (c)(1),
(2) Date: Aug. 26, 2015

(87) PCT Pub. No.: WO2015/072025
PCT Pub. Date: May 21, 2015

(65) Prior Publication Data
US 2016/0011903 A1    Jan. 14, 2016

(51) Int. Cl.
*G06F 17/30* (2006.01)
*G06F 9/46* (2006.01)
*G06F 16/2455* (2019.01)

(52) U.S. Cl.
CPC .......... *G06F 9/46* (2013.01); *G06F 16/24556* (2019.01)

(58) Field of Classification Search
None
See application file for complete search history.

(56) References Cited

U.S. PATENT DOCUMENTS

| | | | | |
|---|---|---|---|---|
| 8,549,010 B2* | 10/2013 | Oikarinen | ......... | G06F 17/30289 707/741 |
| 8,676,951 B2* | 3/2014 | Shiga | .................. | G06F 17/3033 709/223 |
| 9,201,742 B2* | 12/2015 | Bulkowski | ........ | G06F 17/30584 |
| 9,471,657 B1* | 10/2016 | Xiao | .................. | G06F 17/30575 |
| 9,569,517 B1* | 2/2017 | Smola | ............... | G06F 17/30575 |
| 9,720,989 B2* | 8/2017 | Theimer | ........... | G06F 17/30569 |
| 2004/0117345 A1* | 6/2004 | Bamford | ............. | G06F 17/3038 |
| 2011/0225122 A1 | 9/2011 | Denuit et al. | | |

(Continued)

OTHER PUBLICATIONS

International Search Report of PCT/JP2013/080972.

*Primary Examiner* — Jeff A Burke
(74) *Attorney, Agent, or Firm* — Mattingly & Malur, PC

(57) ABSTRACT

A computer system includes a node including a plurality of processes, an instruction unit that designates a key range of data processed by the process, and a distribution unit. When a first key range is processed by a first process and a third key range, which is a portion of the first key range, is processed by a second process that processes a second key range, the instruction unit transmits a first updated key range to the first process, transmits a second updated key range to the second process, and transmits third range update information including first and second new ranges to the distribution unit. When receiving the third range update information, the distribution unit changes the distribution of the data to be processed. The first process performs data processing in the first updated key range and the second process performs data processing in the second updated key range.

12 Claims, 13 Drawing Sheets

(56) References Cited

U.S. PATENT DOCUMENTS

| | | | |
|---|---|---|---|
| 2012/0290582 A1* | 11/2012 | Oikarinen | G06F 17/30289 707/741 |
| 2013/0332608 A1* | 12/2013 | Shiga | G06F 9/5088 709/226 |
| 2015/0379009 A1* | 12/2015 | Reddy | G06F 17/3033 707/747 |

* cited by examiner

DETAILS OF COMPUTER APPARATUS

OUTLINE OF REBALANCING PROCESS

Fig.4

CONFIGURATION INFORMATION 400

| COMPUTER APPARATUS ID (401) | NODE ID (402) | GROUP INFORMATION (403) |
|---|---|---|
| COMPUTER 1 | NODE 1 | GROUP A, GROUP B |
| COMPUTER 2 | NODE 2 | GROUP A, GROUP C |
| COMPUTER 3 | NODE 3 | GROUP B, GROUP C |

Fig.5

SYSTEM RANGE INFORMATION 500

| GROUP ID (501) | RANGE (502) |
|---|---|
| GROUP A | 1 ~ 1000 |
| GROUP B | 1001 ~ 1700 |
| GROUP C | 1701 ~ 2000 |

Fig.6
GROUP INFORMATION OF PROCESS BELONGING TO GROUP A
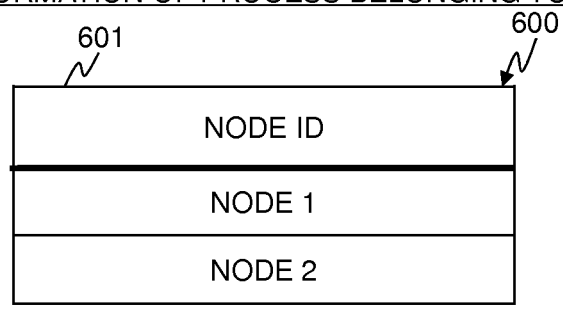
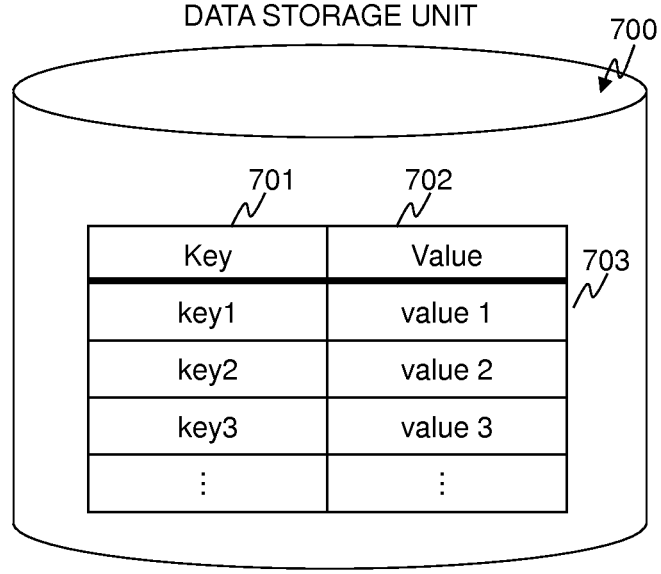
Fig.7
DATA STORAGE UNIT

COMMUNICATION MESSAGE SYSTEM

PROCESS OF TELEGRAM EXECUTION UNIT

PROCESS OF COPY UNIT IN COPY DESTINATION NODE

COMPUTER SYSTEM, COMPUTER SYSTEM MANAGEMENT METHOD AND PROGRAM

BACKGROUND

Technical Field

The present invention relates to a distributed database formed by a plurality of computers.

Background Art

In recent years, the amount of data has increased rapidly in a computer system which executes applications using a Web and various systems have been known which distribute data to a plurality of servers and improve a data access performance. For example, in a relational database management system (RDBMS), a method has been known which separates data into predetermined ranges (for example, key ranges) and distributes the separated data to a plurality of servers, thereby improving the access performance of the entire system.

In addition, a Not only SQL (NoSQL) database, such as a key value store (KVS), has been known as a system used in, for example, a cache server. The KVS stores a plurality of records each having a pair of data (value) and a data identifier (key).

The KVS has various structures, such as a structure (memory storage) in which data is stored in a volatile recording medium that can access data at a high speed, for example, a memory, a structure (disk storage) in which data is stored in a non-volatile recording medium having a high data storage permanence, for example, a solid state disk (SSD) or an HDD, and a combination of the structures.

In an in-memory KVS, a data access speed is higher than that in a disk-type KVS. However, the in-memory KVS has some defects. First, the in-memory KVS has a lower memory capacity which can be mounted in one server than the SSD or the HDD due to, for example, physical restrictions and stores a smaller amount of data than the disk-type KVS. Second, since the memory is a volatile recording medium, data in the memory is erased when the server is stopped due to any failure.

An example of the system which overcomes the defects is an in-memory distributed KVS (hereinafter, referred to as a distributed KVS). A plurality of servers are separated into clusters and the distributed KVS is formed on a memory of the server included in the cluster. For the first defect, the memories of a plurality of servers are integrated to ensure memory capacity which cannot be obtained by one server. For the second defect, the same data is copied between a plurality of servers to prevent data from being erased even when some of the servers are stopped.

Each server which form the distributed KVS takes charge of a range which does not overlap the ranges of other servers and stores an aggregate (hereinafter, referred to as a partition) of data included in the range. In addition, each server stores copies of the partitions which are managed by other servers.

A special server, such as a management server, is not present or is multiplexed in the distributed KVS. Therefore, a single point of failure does not occur in the distributed KVS. That is, even when a failure occurs in an arbitrary server, it is possible to continuously perform a process on the basis of the partitions copied by other servers and the computer system is not stopped. Therefore, the distributed KVS also has fault-tolerance.

When the amount of data stored in the distributed KVS increases, a load applied to the server increases or a data storage space is reduce. As one of the measures for solving the problems, there is a scale-out system in which a new server is added to a cluster. In the scale-out system, a process (hereinafter, referred to as a rebalancing process) that changes the range which the server takes charge of is performed. In addition, when data is distributed only to some of the servers, the throughput of the system is reduced. As one of measures for solving the problem, the rebalancing process is performed to solve the data unbalance problem.

A technique related to the above-mentioned rebalancing process is disclosed in Patent Document 1.

Patent Document 1 discloses a technique in which a process of preparing a new partition after rebalancing for the existing range and the existing partition corresponding to the existing range, copying data from the existing partition to the new partition, and switching access from the existing range and the existing partition corresponding to the existing range to the new range and the new partition corresponding to the new range after the copying of data is completed is performed to achieve the rebalancing process.

CITATION LIST

Patent Document

Patent Document 1: US 2011/0225122 A

DISCLOSURE OF THE INVENTION

Problem to be Solved by the Invention

An application using the distributed KVS is also applied to on-line commerce, such as a bank account or Internet shopping. Therefore, it is necessary to perform the rebalancing process which adjusts the load between the servers, without stopping the distributed KVS, such that the application can continuously perform a process.

However, in Patent Document 1, the system is the worst at the time when data access switches from the existing partition to the new partition in order to move the range after the copying of data to the new partition is completed.

For example, it is necessary to notify a server group having the existing partition and a server group having the new partition of the switching of data access. In this case, it is considered that, when all of the servers are not notified of the switching of data access, the rebalancing process is not completed and the system is stopped.

In addition, when a portion of the server group having the existing partition is not notified of the switching of data access due to, for example, communication time-out, the following method is considered in order to prevent the system from being stopped: it is determined that the server is stopped and the switching of data access is performed only in the other servers. Here, when the server is operating and access to data in the server is performed, data consistency between the existing partition and the new partition is broken.

For example, a case will be described in which a partition A and a partition B are combined into a new partition, a server A stores the partition A, and a server other than the server A stores the partition B and the new partition. When the server A is not notified of the switching of data access, the system determines that the server A has been stopped and performs the switching of data access. When the server A is operating and access to data in the server A is performed, the update of data in the partition A which has copied to the new partition is not reflected in the partition A since the system determines that the server A has been stopped. Therefore, data consistency between the existing partition A and the partition A copied to the new partition is broken until the system finds that the server A has not been stopped.

When it is difficult to notify the switching of data access due to, for example, communication time-out, the following method is considered in order to prevent both the stopping of the system and the breaking of data consistency: a data access control unit, an existing partition, and a new partition are multiplexed; when the number of components which transmit a response among the multiplexed components is equal to or greater than a quorum, it is considered that the agreement between the components is made and data consistency is guaranteed; and the switching of data access is performed. When networks which can communicate with each other are divided into a plurality of small networks due to, for example, the failure of a core switch, the system is likely to be stopped.

For example, the following case is considered: a partition A and a partition B are combined into a new partition; and each of four components including the two partitions, the new partition, and a data access control unit is quintuplexed. In this case, it is necessary to construct a network in which the components can communicate with each other when a quorum is three or more, in order to perform the switching of data access. The maximum number of servers is 12 (=four components×a quorum of 3). When network partition occurs, a maximum of 12 servers do not remain in the same small network and it is difficult to perform the switching of data access.

Means for Solving Problem

A representative example of a technique disclosed in the invention is as follows.

A computer system includes a node including a plurality of processes that perform data processing, an instruction unit that designates a key range of data processed by the process, and a distribution unit that distributes data to be processed. When data in a first key range is processed by a first process and data in a third key range, which is a portion of the first key range, is processed by a second process that processes data in a second key range, the instruction unit transmits, to the first process, first range update information that includes information indicating a first updated key range obtained by removing the third key range from the first key range, transmits, to the second process, second range update information that includes information indicating a second updated key range obtained by adding the third key range to the second key range, and transmits, to the distribution unit, third range update information that includes the first updated key range associated with the first process and the second updated key range associated with the second process. When receiving the third range update information, the distribution unit changes the range of data to be distributed to the first process and the second process. When receiving the first range update information, the first process performs data processing in the first updated key range. When receiving the second range update information, the second process performs data processing in the second updated key range.

Effect of the Invention

According to the invention, it is possible to improve the reliability of a system using a distributed KVS.

BRIEF DESCRIPTION OF DRAWINGS

FIG. 4 is a diagram illustrating an example of configuration information according to Embodiment 1.

FIG. 5 is a diagram illustrating an example of system range information according to Embodiment 1.

FIG. 6 is a diagram illustrating an example of group information according to Embodiment 1.

FIG. 7 is a diagram illustrating the format of data stored in a data storage unit according to Embodiment 1.

MODE(S) FOR CARRYING OUT THE INVENTION

Embodiment 1

First, the outline of this embodiment will be described.

Figure 1:
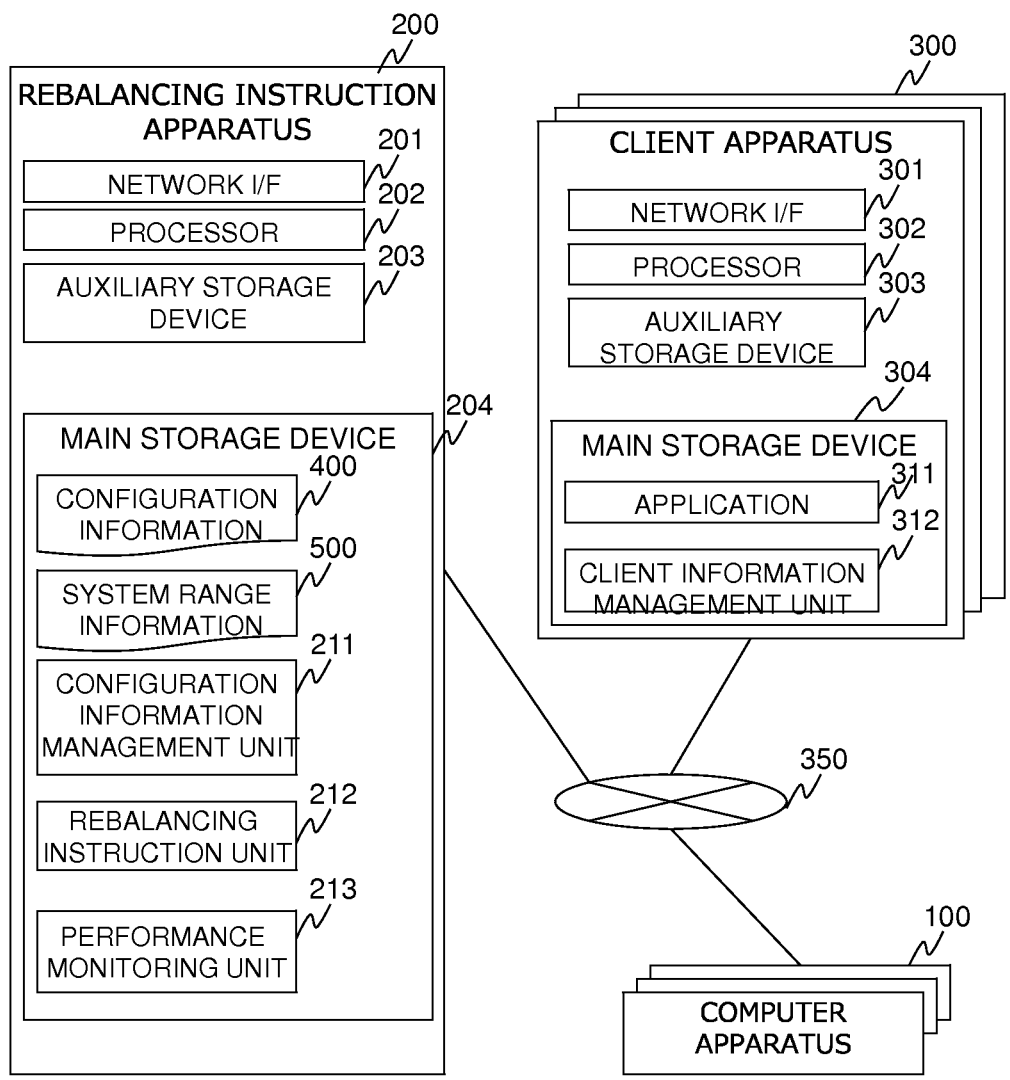
FIG. 1 is a block diagram illustrating the structure of a computer system, the details of a rebalancing instruction apparatus, and the details of a client apparatus in an embodiment.

FIG. 1 is a block diagram illustrating the structure of a computer system, the details of a client apparatus 300, and the details of a rebalancing instruction apparatus 200 in Embodiment 1.

The computer system includes a plurality of computer apparatuses 100, a rebalancing instruction apparatus 200, and a client apparatus 300. The computer apparatus 100 may also function as the rebalancing instruction apparatus 200. In this case, the rebalancing instruction apparatus 200 may be multiplexed to achieve redundancy. The computer apparatuses 100 are connected to each other through a network 350. The rebalancing instruction apparatus 200 and the computer apparatus 100 are connected to each other through the network 350. The computer apparatus 100 and the client apparatus 300 are connected to each other through the network 350. Various wired and wireless networks, such as a LAN, a WAN, and a SAN, are considered as the network 350. Any network may be used as long as it enables the computer apparatus 100, the rebalancing instruction apparatus 200, and the client apparatus 300 to communicate with each other. The network 350 includes a plurality of network devices (not illustrated). The network device includes, for example, a switch and a gateway.

First, the details of the computer apparatus 100 illustrated in FIG. 2 will be described before the details of the rebalancing instruction apparatus 200 and the client apparatus 300 illustrated in FIG. 1 are described.

Figure 2:
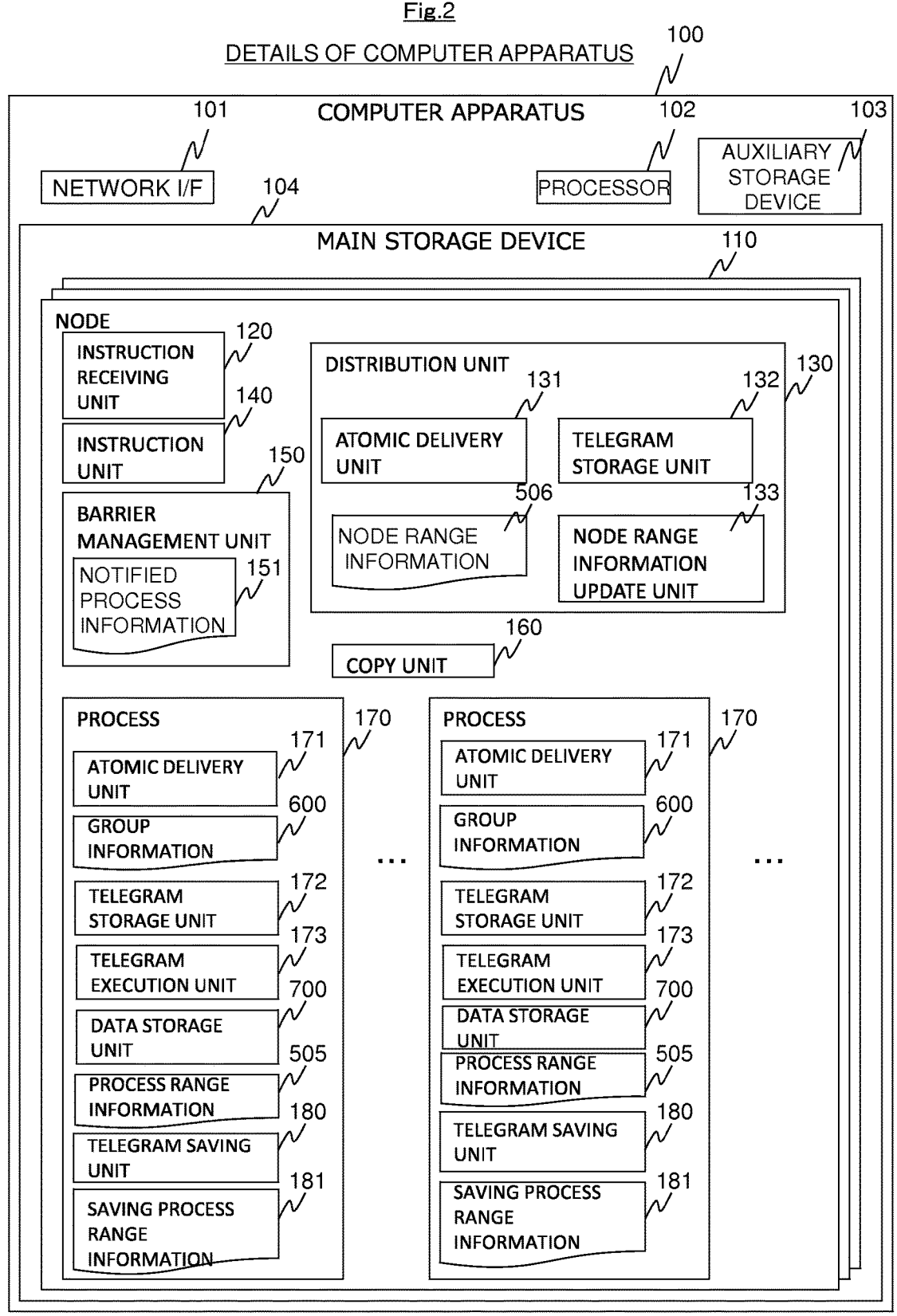
FIG. 2 is a block diagram illustrating the details of a computer apparatus according to the embodiment.

FIG. 2 is a block diagram illustrating the details of the computer apparatus 100 according to Embodiment 1.

The computer apparatus 100 includes a network interface 101, a processor 102, an auxiliary storage device 103, and a main storage device 104 and forms the computer system. The computer apparatus 100 performs various processes in response to instructions 800 transmitted from other computer apparatuses 100, the rebalancing instruction apparatus 200, and the client apparatus 300. Each computer apparatus 100 may have at least the components illustrated in FIG. 2.

The computer apparatus 100 may include an input device, such as a keyboard, a mouse, or a touch panel, and an output device, such as a display.

The network interface 101 is an interface for connection to other apparatuses through the network 350.

The processor 102 performs the functions of each processing unit implemented by a program which is stored in the main storage device 104. In this embodiment, each processing unit is implemented by the program. However, each processing unit may be a hardware component. The processor 102 executes the program to implement the functions of the computer apparatus 100. Hereinafter, when a process is described using the program as the subject, the processor 102 executes the program to implement the process.

The auxiliary storage device 103 stores various kinds of information. For example, an HDD or an SSD is considered as the auxiliary storage device 103. A disk store (not illustrated) for constructing a distributed KVS may be constructed in the auxiliary storage device 103.

The main storage device 104 stores the program executed by the processor 102 and information required to execute the program. For example, a memory is considered as the main storage device 104.

The main storage device 104 according to this embodiment stores a program for implementing a node 110. One computer apparatus 100 may include a plurality of nodes 110.

The node 110 is formed by a program for implementing the functions of an instruction receiving unit 120, a distribution unit 130, an instruction unit 140, a barrier management unit 150, a copy unit 160, and a plurality of processes 170.

The distribution unit 130 includes an atomic delivery unit 131, a telegram storage unit 132, and a node range information update unit 133. In addition, the distribution unit 130 has node range information 506 as necessary information. The node range information 506 has the same structure as system range information 500 illustrated in FIG. 5.

The barrier management unit 150 has notified process information 151 as necessary information. The notified process information 151 will be described with reference to FIG. 12.

The process 170 includes an atomic delivery unit 171, a telegram storage unit 172, a telegram execution unit 173, a data storage unit 700, and a telegram saving unit 180. In addition, the process 170 stores, as necessary information, process range information 505, group information 600, and saving process range information 181. The process range information 505 and the saving process range information 181 have the same structure as the system range information 500 illustrated in FIG. 5.

Next, the program and information stored in the main storage device 104 will be described.

The instruction receiving unit 120 receives the instructions 800 transmitted from the computer apparatus 100, the client apparatus 300, and the rebalancing instruction apparatus 200 and relays the instructions 800 to the distribution unit 130, the instruction unit 140, or the copy unit 160 according to the content of the instructions 800.

The instruction unit 140 performs a range update process, which will be described below, on the basis of the instruction 800 received from the instruction receiving unit 120. This operation will be described in detail with reference to FIG. 9.

The copy unit 160 performs in-group process copying, which will be described below, on the basis of the instruction 800 received from the instruction receiving unit 120. This operation will be described in detail with reference to FIGS. 13 and 14.

The process 170 is the unit of processing for one range. The process 170 is a system (which is also referred to as a state machine or an automaton) in which the behavior of a target is represented by a "state" and an "event" and stores the current state therein. When an event is input from the outside, the process 170 performs a "state transition" from the current state to the next state according to a predetermined rule.

When data for a key which is stored in a KVS is regarded as the "state", an operation of updating the data for the key is regarded as the "event", and a process of updating the data for the operation is regarded as the "state transition", the KVS can be treated as an aggregate of the processes 170 for each key.

However, when the aggregate of the processes 170 for each key is used, the number of processes 170 significantly increases, which is not practical. For example, when the data length of the key is 4 bytes, the number of keys which can be expressed by 4 bytes is the 32nd power of 2 and the number of necessary processes 170 is about 4,200,000,000.

Therefore, for the KVS, one process 170 is preferably used for each aggregate of keys included in a specific range. The range means the range of a hash value. A hash value is calculated from the key of each data item and the process 170 which takes charge of the range including the calculated hash value stores the data. This method is referred to as a consistent hashing method. In addition to the above-mentioned method, for example, a range method and a list method may be used.

When the distributed KVS is implemented by the process 170, a plurality of processes 170 which copy data need to perform the same operation in order to maintain data consistency between the plurality of processes 170. In addition, an aggregate of the processes 170 which perform the same operation in order to copy data is referred to as a "group". It is necessary to input the same event to all of the processes 170 belonging to the group in the same input order in order to make all of the processes 170 belonging to the group perform the same operation. The atomic delivery unit 171 is used to determine the event input order.

The atomic delivery units 171 of the processes 170 belonging to the same group can communicate with each other. Information related to the group is stored as group information 600. For example, the atomic delivery unit 171 delivers the same telegram 900 in the same order in the group, using a distributed consensus algorithm. This distribution method is referred to as atomic deliver (also referred to as total order broadcast or atomic broadcast in some cases). This operation will be described in detail with reference to FIG. 10.

The telegram storage unit 172 temporarily stores the telegram 900 which is atomically delivered by the atomic delivery unit 171 in a first-in-first-out (FIFO) manner.

The telegram execution unit 173 extracts the telegram 900 from the telegram storage unit 172 and performs various kinds of processing corresponding to the telegram 900 for the data which is managed by the data storage unit 700. The various kinds of processing include, for example, the writing of data, the overwriting of data, and the deletion of data. This operation will be described in detail with reference to FIG. 11.

The distribution unit 130 performs, for example, a data update operation on the basis of a data update instruction 802 received from the instruction receiving unit 120. This operation will be described in detail with reference to FIG. 9.

The atomic delivery units 131 included in all of the nodes 110 can communicate with each other. However, the distribution unit 130 does not have information corresponding to the group information 600 stored in the process 170 and performs atomic delivery on the basis of the group information 600 designated by the instruction unit 140. This operation will be described in detail with reference to FIG. 10.

The telegram storage unit 132 temporarily stores the telegram 900 which is atomically delivered by the atomic delivery unit 131 in a FIFO manner.

The node range information update unit 133 extracts a range update telegram 901 stored in the telegram storage unit 132 and updates node range information 506.

The barrier management unit 150 controls the execution time between the processes 170 belonging to two groups which perform a range update process, which will be described below. This operation will be described in detail with reference to FIG. 12.

The computer apparatus 100 has been described above and the rebalancing instruction apparatus 200 and the client apparatus 300 illustrated in FIG. 1 will be described.

The rebalancing instruction apparatus 200 includes a network interface 201, a processor 202, an auxiliary storage device 203, and a main storage device 204 and controls a rebalancing process for the computer apparatus 100.

The network interface 201 is an interface for connection to other apparatuses through the network 350.

The processor 202 executes a program which is stored in the main storage device 204. The processor 202 executes the program to implement the functions of the rebalancing instruction apparatus 200. Hereinafter, when a process is described using the program as the subject, the processor 202 executes the program to implement the process.

The auxiliary storage device 203 stores various kinds of information. For example, an HDD or an SSD is considered as the auxiliary storage device 203.

The main storage device 204 stores the program executed by the processor 202 and information required to execute the program. For example, a memory is considered as the main storage device 204.

The main storage device 204 according to this embodiment stores a program for implementing the functions of a performance monitoring unit 213, a rebalancing instruction unit 212, and a configuration information management unit 211. In addition, the main storage device 204 stores configuration information 400 and the system range information 500 as necessary information.

Next, the program and information stored in the main storage device 204 will be described.

The rebalancing instruction unit 212 transmits the instruction 800 to each node 110 in order to implement a rebalancing process. This operation will be described in detail with reference to FIG. 9.

The configuration information management unit 211 manages the configuration information 400 related to the configuration of the node 110 and the process 170 included in the node 110. This operation will be described in detail with reference to FIG. 9.

The performance monitoring unit 213 periodically collects the performance index of each group. When the unbalance between the performance indexes of the groups is detected from the collection result, the performance monitoring unit 213 instructs the rebalancing instruction unit 212 to perform the rebalancing process of correcting the unbalance. This operation will be described in detail with reference to FIG. 9.

The client apparatus 300 includes a network interface 301, a processor 302, an auxiliary storage device 303, and a main storage device 304 and transmits the data update instruction 802 to the node 110.

The network interface 301 is an interface for connection to other apparatuses through the network 350.

The processor 302 executes a program which is stored in the main storage device 304. The processor 302 executes the program to implement the functions of the client apparatus 300. Hereinafter, when a process is described using the program as the subject, the processor 302 executes the program to implement the process.

The auxiliary storage device 303 stores various kinds of information. For example, an HDD or an SSD is considered as the auxiliary storage device 303.

The main storage device 304 stores the program executed by the processor 302 and information required to execute the program. For example, a memory is considered as the main storage device 304.

The main storage device 304 according to this embodiment stores a program for implementing the functions of an application 311 and a client information management unit 312.

Next, the program and information stored in the main storage device 304 will be described.

The application 311 requests the client information management unit 312 to perform, for example, a data update operation. In addition, the application 311 receives the result of the request from the client information management unit 312.

The client information management unit 312 creates the data update instruction 802 in response to the data update operation requested by the application 311, acquires the latest system range information 500 and configuration information 400 from the configuration information management unit 211, searches for the node 110 which takes charge of data processing, and transmits the created data update instruction 802 to the node 110. When receiving a data update completion response 852 which is the execution result of the data update instruction 802 from the node 110, the client information management unit 312 transmits the result of the request to the application 311. The data update instruction 802 and the data update completion response 852 will be described with reference to FIG. 8.

In this embodiment, the functions of the computer apparatus 100, the rebalancing instruction apparatus 200, and the client apparatus 300 are implemented by software. However, the functions may be implemented by dedicated hardware.

FIGS. 3(a) to 3(f) are diagrams illustrating the outline of the rebalancing process.

In this example, it is assumed that the hash value is calculated in the range of 1 to 2000 and all of data treated by the system can be stored in the range of 1 to 2000. A distributed KVS will be described which processes, for example, a data update operation in a group A for processing data that is included in the range α of 1 to 1000 and is represented by a circle, a group B for processing data that is in the range β of 1001 to 1700 and is represented by a rectangle, and a group C for processing data that is in the range γ of 1701 to 2000 and is represented by a triangle.

Figure 3A:
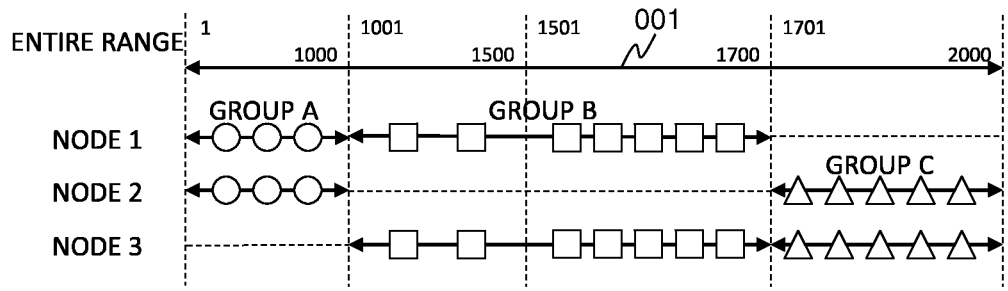
FIG. 3(a) is a diagram illustrating the outline of a rebalancing process.

As illustrated in FIG. 3(a), the group A processes three data items in the range α and the data items are multiplexed by the data storage units 700 of the processes 170 which are included in node 1 and node 2 and belong to the group A. Therefore, the group A stores a total of six (=3 data items× duplexing) data items. Similarly, the group B processes seven data items in the range β and the data items are multiplexed by the data storage units 700 of the processes 170 which are included in node 1 and node 3 and belong to the group B. Therefore, the group B stores a total of 14 (=7 data items×duplexing) data items. The group C processes five data items in the range γ and the data items are multiplexed by the data storage units 700 of the processes 170 which are included in node 2 and node 3 and belong to the group C. Therefore, the group C stores a total of 10 (=5 data items×duplexing) data items.

For this reason, a load unbalance occurs between the groups. Therefore, the rebalancing process is performed which performs the following steps in order to narrow the range β and widen the range α, thereby removing the unbalance: a step of creating a moving group; a step of dividing groups; a step of moving the moving group; a step of combining groups; and a step of deleting the moving group.

Figure 3B:
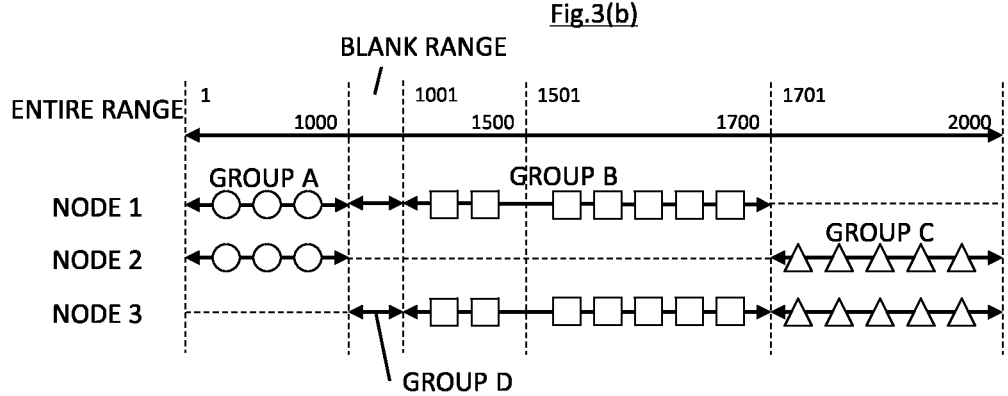
FIG. 3(b) is a diagram illustrating the outline of the rebalancing process.

FIG. 3(b) illustrates a state in which a moving group D that is temporarily used and takes charge of a blank range is created in the node 110 including the group B as a preparatory step to the group division operation from the state illustrated in FIG. 3(a). Specifically, since node 1 and node 3 include the processes 170 belonging to the group B, the moving group D is created in node 1 and node 3. The blank range is described as a blank range, as illustrated in FIG. 3(b).

Figure 3C:
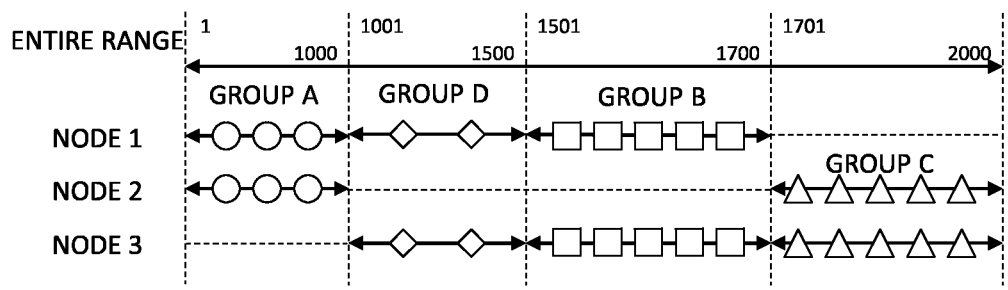
FIG. 3(c) is a diagram illustrating the outline of the rebalancing process.

FIG. 3(c) illustrates a state in which the group division operation is performed to update the range β of the group B and the range δ of the moving group D from the state illustrated in FIG. 3(b). When the group division operation is performed, data stored in the group B in the range which the moving group D newly takes charges of is moved from the group B to the moving group D. Data which the moving group D takes charge of is represented by a rhombus in FIG. 3(c).

Figure 3D:
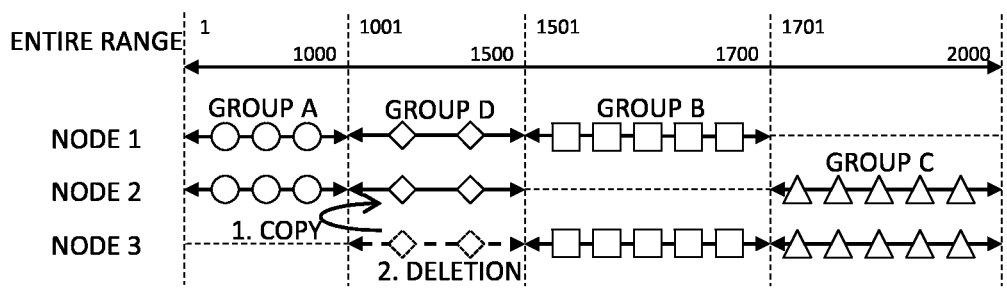
FIG. 3(d) is a diagram illustrating the outline of the rebalancing process.

FIG. 3(d) illustrates a state in which the moving group D is moved to the node 110 including the group A as a preparatory step to a group combination operation from the state illustrated in FIG. 3(c). In order to move the moving group D, first, the processes 170 belonging to the moving group D of node 3 and data stored in the processes 170 are copied to node 2 such that the copied processes 170 belong to the moving group D ("1. Copy" in FIG. 3(d)). Here, a process of copying the processes 170 belonging to a given group to another node 110 such that the processes 170 belong to the given group is referred to as in-group process copying. In FIG. 3(d), the in-group process copying is performed, using the process 170 belonging to the moving group D of node 3 as a copy source. However, the in-group process copying may be performed, using the process 170 belonging to the moving group D of node 1 as the copy source. The processes 170 which belong to the moving group D of node 3 and are obstacles to the group combination operation are deleted ("2. Deletion" in FIG. 3(d)). Here, a process of deleting some of the processes 170 belonging to a given group is referred to as in-group process deletion.

Figure 3E:
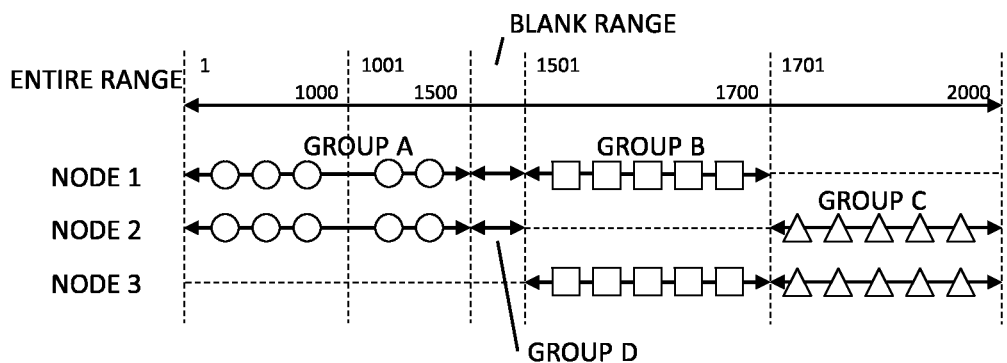
FIG. 3(e) is a diagram illustrating the outline of the rebalancing process.

FIG. 3(e) illustrates a state in which the group combination operation is performed to update the range α of the group A and the range δ of the moving group D from the state illustrated in FIG. 3(d). When the group combination operation is performed, the data stored in the moving group D in the range which the group A newly takes charges of is moved from the moving group D to the group A.

Figure 3F:
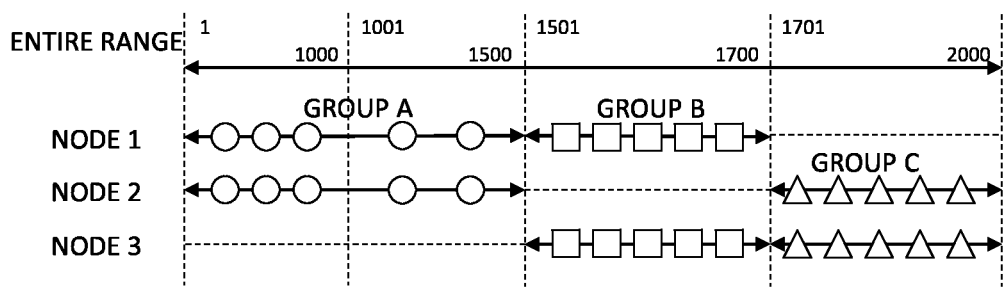
FIG. 3(f) is a diagram illustrating the outline of the rebalancing process.

FIG. 3(f) illustrates a state in which the temporarily created moving group D is deleted from the state illustrated in FIG. 3(e) and the rebalancing process is completed. In this way, the range α of the group A is changed from the range of 1 to 1000 to the range of 1 to 1500 and the range β of the group B is changed from the range of 1001 to 1700 to the range of 1501 to 1700, as compared to FIG. 3(a). In addition, the number of data items stored in each of the group A and the group B is 10 (=5 data items×duplexing). That is, the group A and the group B have the same number of data items.

The group division operation and the group combination operation are implemented by a process which is called a "range update process". Specifically, the group division operation is implemented by updating the range β which the group B takes charge of from the range of 1001 to 1700 to the range of 1501 to 1700 and updating the range δ which the moving group D takes charge of from "-" to the range of 1001 to 1501. The group combination operation is implemented by updating the range δ which the moving group D takes charge of from the range of 1001 to 1501 to "-" and updating the range α which the group A takes charge of from the range of 1 to 1000 to the range of 1 to 1500. The group whose range is narrowed after the range update process is referred to as a movement source group, the group whose range is widened after the range update process is referred to as a movement destination group, the process 170 which belongings to the movement source group is referred to as a movement source process 170, and the process 170 which belongings to the movement destination group is referred to as a movement destination process 170.

Therefore, rebalancing can be performed by the moving group creation and deletion process, the range update process, and the in-group process coping and deletion.

FIG. 4 is a diagram illustrating an example of the configuration information 400 according to Embodiment 1.

The configuration information 400 has information related to the node 110 in each computer apparatus 100 and the groups which are arranged in the node 110. Specifically, the configuration information 400 includes a computer apparatus ID column 401, a node ID column 402, and a group information column 403.

The computer apparatus ID column 401 stores an identifier (computer apparatus ID) for uniquely identifying the computer apparatus 100.

The node ID column 402 stores an identifier (node ID) for uniquely identifying the node 110.

The group information column 403 stores a list of identifiers (group IDs) for uniquely identifying the groups.

FIG. 5 is a diagram illustrating an example of the system range information 500 according to Embodiment 1.

The system range information 500 has information related to the range which each group takes charge of. Specifically, the system range information 500 includes a group ID column 501 and a range column 502.

The group ID column 501 stores a group ID.

The range column 502 stores the range which each group takes charge of. A symbol "-" is stored for a blank range.

In this embodiment, the node range information 506 has only a record related to the groups in the node 110. For example, in the case of node 1 illustrated in FIG. 3(a), node 1 includes the processes 170 belonging to the group A and the processes 170 belonging to the group B. Therefore, the node range information 506 has only records related to the group A and the group B among the records in the system range information 500 illustrated in FIG. 5.

In addition, the process range information 505 has only records related to the groups to which the processes 170 belong. For example, in the case of the processes 170 belonging to the group A illustrated in FIG. 3(a), the process range information 505 has only the record related to the group A among the records in the system range information 500 illustrated in FIG. 5.

FIG. 6 is a diagram illustrating the format of data in the group information 600 according to Embodiment 1.

The group information 600 has information related to the node 110 that includes the process 170 belonging to the group to which the atomic delivery unit 171 of the process 170 atomically delivers the telegram 900. The group information 600 includes a node ID column 601.

The node ID column 601 stores a node ID.

FIG. 7 is a diagram illustrating the format of data stored in the data storage unit 700 according to Embodiment 1.

In Embodiment 1, the data storage unit 700 stores data management information 703. The data management information 703 includes a plurality of data items each having a key and a value. Hereinafter, the data including the key and the value is also referred to as key-value-type data.

The data management information 703 includes a key column 701 and a value column 702.

The key column 701 stores an identifier (key) for identifying data. The value column 702 stores actual data (value).

The user who operates the client apparatus 300 can designate a key to store data in the distributed KVS and can designate a key to acquire desired data from the distributed KVS.

The format of the data stored in the data storage unit 700 is not limited to that illustrated in FIG. 7. For example, a data format in which the hash value of the key is associated with the value may be used.

Figure 8:
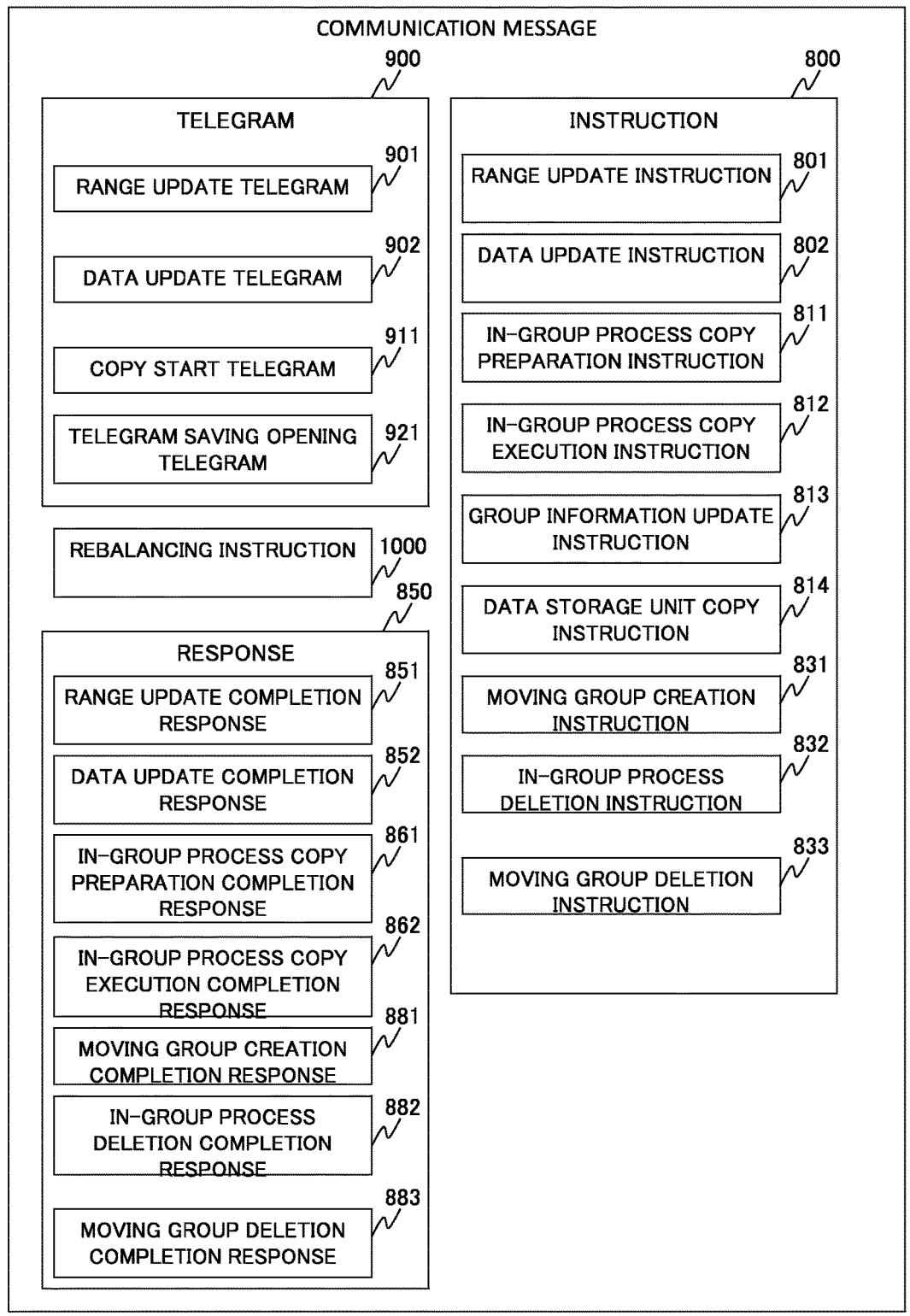
FIG. 8 is a diagram illustrating a communication message system according to the embodiment.

FIG. 8 is a diagram illustrating the communication message which is treated.

The communication message includes a rebalancing instruction 1000 which is a communication message for instructing the rebalancing instruction unit 212 to perform the rebalancing process, the instruction 800 which is a communication message for instructing the node 110 to perform various processes including the range update process, and a response 850 to the instruction 800, and the telegram 900 which is a communication message atomically delivered by the atomic delivery unit 131 or the atomic delivery unit 171.

The rebalancing instruction 1000 is a communication message which is transmitted from, for example, the performance monitoring unit 213 to the rebalancing instruction unit 212. The rebalancing instruction 1000 includes range update information. The range update information is similar to the system range information 500 illustrated in FIG. 5 and is a table which stores a plurality of records of a group ID column and a new range column.

The instruction 800 includes a range update instruction 801, a data update instruction 802, an in-group process copy preparation instruction 811, an in-group process copy execution instruction 812, a group information update instruction 813, a data storage unit copy instruction 814, a moving group creation instruction 831, an in-group process deletion instruction 832, and a moving group deletion instruction 833.

The response 850 includes a range update completion response 851, a data update completion response 852, an in-group process copy preparation completion response 861, an in-group process copy execution completion response 862, a moving group creation completion response 881, an in-group process deletion completion response 882, and a moving group deletion completion response 883.

The telegram 900 includes a range update telegram 901, a data update telegram 902, a copy start telegram 911, and a telegram saving opening telegram 921.

The data update instruction 802 is one of the data times to be processed and is the instruction 800 for requesting a data update operation, that is, the execution of an update process for data. In this embodiment, the update process for data includes, for example, the writing of data, the overwriting of data, and the deletion of data.

The data update telegram 902 is one of the data times to be processed and stores the same content as the data update instruction 802.

The data update completion response 852 is the response 850 which is transmitted from the distribution unit 130 that has received the data update instruction 802 to the client information management unit 312 in order to notify the completion of the data update process. The data update completion response 852 includes the execution result of the data update process.

The range update instruction 801 is the instruction 800 which is transmitted to the node 110 in the range update process. The range update instruction 801 includes a barrier ID which is uniquely generated for each range update process and range update information.

The range update telegram 901 is the telegram 900 which is atomically delivered in each group by the atomic delivery unit 131 of the distribution unit 130 and the atomic delivery unit 171 of the process 170 in the range update process. The range update telegram 901 includes a barrier ID and range update information, similarly to the range update instruction 801.

The range update completion response 851 is the response 850 which is transmitted from the instruction unit 140 that has received the range update instruction 801 to the rebalancing instruction unit 212 in order to notify the completion of the range update process. The range update completion response 851 does not particularly have information.

The in-group process copy preparation instruction 811, the in-group process copy execution instruction 812, the group information update instruction 813, the data storage unit copy instruction 814, the copy start telegram 911, the in-group process copy preparation completion response 861, and the in-group process copy execution completion response 862 are communication messages used in the in-group process copying.

Next, some terms related to the in-group process copying are defined. First, the group to be subjected to the in-group process copying is referred to as a copy target group. The process 170 which is newly generated by the in-group process copying is referred to as a copy destination process 170, and the node 110 including the copy destination process 170 is referred to as a copy destination node 110. Among the processes 170 belonging to the copy target group before the in-group process copying, the process 170 which transmits the data storage unit copy instruction 814 to the copy destination process 170 is referred to as a copy source process 170. The node 110 including the copy source process 170 is referred to as a copy source node 110. In the group information 600 which is referred to by the atomic delivery unit 171, the previous group including the copy destination node 110 is referred to an old group and the next group including the copy destination node 110 is referred to as a new group. In addition, the group information 600 indicating the new group is referred to as new group information.

The in-group process copy preparation instruction 811 is the instruction 800 which is transmitted from the rebalancing instruction unit 212 to the copy destination node 110. The in-group process copy preparation instruction 811 includes the ID of the copy target group.

The in-group process copy preparation completion response 861 is the response 850 which is transmitted from the copy destination node 110 that has received the in-group process copy preparation instruction 811 to the rebalancing instruction unit 212 in order to notify the completion of the preparation of the copy destination process 170. The in-group process copy preparation completion response 861 does not particularly have information.

The in-group process copy execution instruction 812 is the instruction 800 which is transmitted from the rebalancing instruction unit 212 to the copy source node 110. The in-group process copy execution instruction 812 includes the ID of the copy target group and the ID of the copy destination node 110.

The group information update instruction 813 is the instruction 800 which is transmitted from the copy source node 110 to the copy destination node 110. The group information update instruction 813 includes new group information.

The copy start telegram 911 is the telegram 900 which is atomically delivered to the process 170 belonging to the old group by the atomic delivery unit 171 of the copy source process 170. The copy start telegram 911 includes new group information, the ID of the copy destination node 110, and the ID of the copy source node 110.

The data storage unit copy instruction 814 is the instruction 800 which is transmitted from the copy source process 170 to the copy destination node 110. The data storage unit copy instruction 814 includes information required to copy all of the data stored in the data storage unit 700 of the copy source process 170.

The in-group process copy execution completion response 862 is the response 850 which is transmitted from the copy destination node 110 that has received the data storage unit copy instruction 814 to the rebalancing instruction unit 212 in order to notify the completion of the copy of the copy destination process 170. The in-group process copy execution completion response 862 does not particularly have information.

The moving group creation instruction 831 and the moving group creation completion response 881 are communication messages used in the moving group creation process.

The moving group creation instruction 831 is the instruction 800 transmitted from the configuration information management unit 211 to the node 110 that creates the moving group. The moving group creation instruction 831 includes the group information 600 having a list of the ID of the moving group to be processed and the ID of the node 110 that creates the moving group.

The moving group creation completion response 881 is the response 850 which is transmitted from the node 110 that has received the moving group creation instruction 831 in order to notify the completion of the creation of the process 170 belonging to the moving group. The moving group creation completion response 881 does not particularly have information.

The in-group process deletion instruction 832 and the in-group process deletion completion response 882 are communication messages used in the in-group process deletion.

The in-group process deletion instruction 832 is the instruction 800 transmitted from the configuration information management unit 211 to all of the nodes 110 that perform the in-group process deletion. The in-group process deletion instruction 832 includes the ID of the group to be processed.

The in-group process deletion completion response 882 is the response 850 which is transmitted from the node 110 that has received the in-group process deletion instruction 832 in order to notify the completion of the deletion of the processes 170 belonging to the group to be processed. The in-group process deletion completion response 882 does not particularly have information.

The moving group deletion instruction 833 and the moving group deletion completion response 883 are communication messages used in a moving group deletion process.

The moving group deletion instruction 833 is the instruction 800 which is transmitted from the configuration information management unit 211 to all of the nodes 11 that delete the moving group. The moving group deletion instruction 833 includes the ID of the moving group to be processed.

The moving group deletion completion response 883 is the response 850 which is transmitted from the node 110 that has received the moving group deletion instruction 833 in order to the completion of the deletion of the processes 170 belonging to the moving group. The moving group deletion completion response 883 does not particularly have information.

Figure 9:
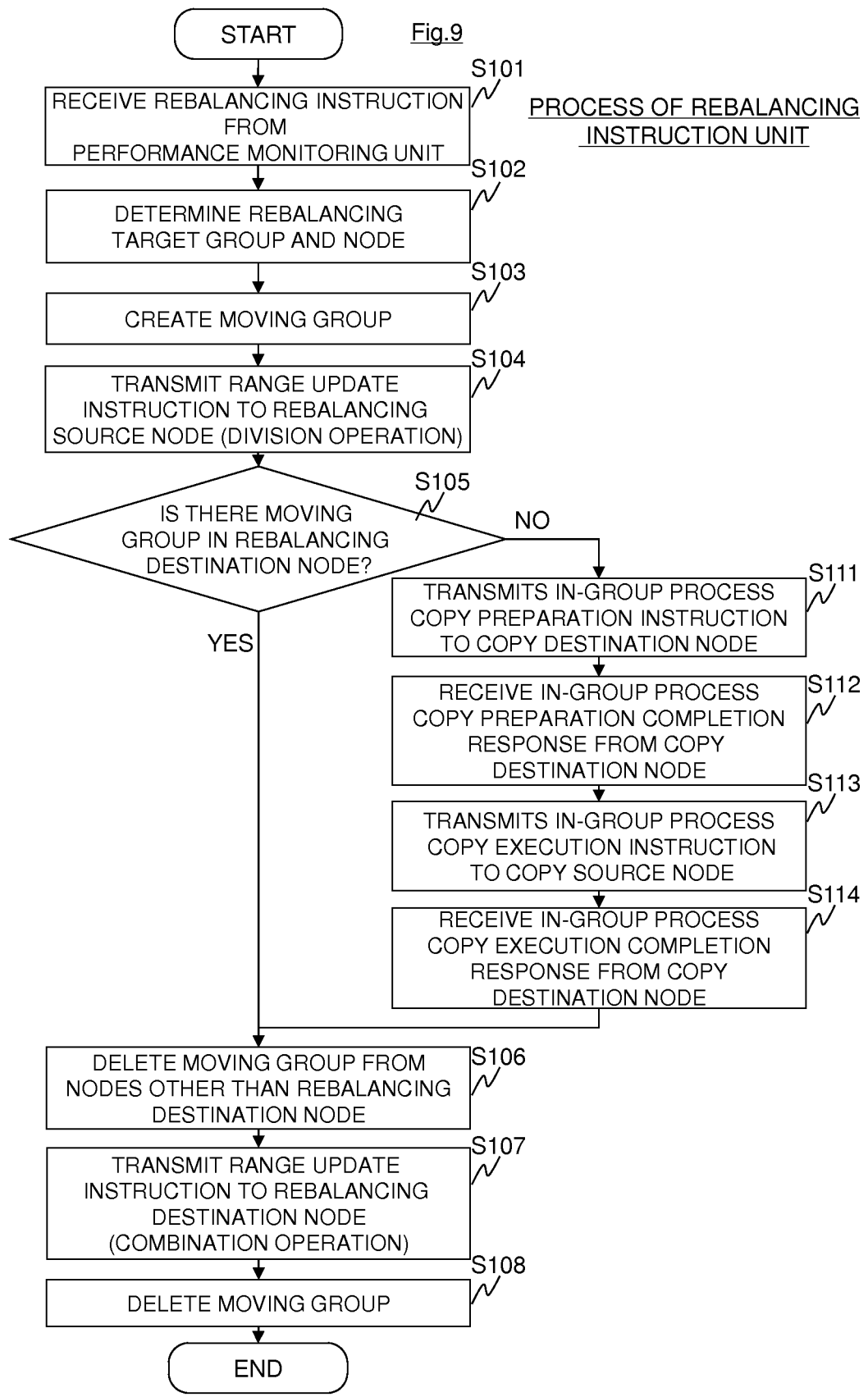
FIG. 9 is a flowchart illustrating the process of a rebalancing instruction unit according to Embodiment 1.

FIG. 9 is a flowchart illustrating the process of the rebalancing instruction unit 212 according to Embodiment 1.

First, the performance monitoring unit 213 periodically collects a performance index, such as the number of data items stored in the data storage unit 700 of the process 170 belonging to each group or the number of telegrams processed by the telegram execution unit 173 of the process 170 belonging to each group per unit time. Then, the performance monitoring unit 213 detects the unbalance between the performance indexes of the groups from the collection results. When the unbalance between the performance indexes is detected, the performance monitoring unit 213 calculates a range capable of correcting the unbalance. The performance monitoring unit 213 creates a rebalancing instruction 1000 for the rebalancing instruction unit 212 on the basis of the calculated range and transmits the rebalancing instruction 1000 to the rebalancing instruction unit 212.

For example, in the case of FIG. 3(a), since the performance monitoring unit 213 can detect the unbalance of the number of data items included in the group B, calculates a new range capable of correcting the unbalance. Here, since four data items (=2 data items×duplexing) among the data items included in the group B are included in the range of 1001 to 1500, the range of 1001 to 1500 is moved to the range α of the group A to correct the unbalance. Therefore, the rebalancing instruction 1000 that includes range update information having a record of a group ID column "group A"

and a new range column "1 to 1500" and a record of a group ID column "group B" and a new range column "1501 to 1700" is created and transmitted to the rebalancing instruction unit 212.

The rebalancing instruction unit 212 receives the rebalancing instruction 1000 from the performance monitoring unit 213 (Step S101).

The rebalancing instruction unit 212 that has received the rebalancing instruction 1000 determines a rebalancing source group with a narrow range, a rebalancing destination group with a wide range, a rebalancing source node 110 including the rebalancing source group, and a rebalancing destination node 110 including the rebalancing destination group from the range update information included in the rebalancing instruction 1000, the system range information 500, and the configuration information 400 (Step S102).

For example, in the case of FIG. 3(a), the configuration information 400 has the same data as the configuration information 400 illustrated in FIG. 4 and the system range information 500 has the same data as the system range information 500 illustrated in FIG. 5. The range update information has a record of the group ID column "group A" and the new range column "1 to 1500" and a record of the group ID column "group B" and the new range column "1501 to 1700", as in the example which has been described in the performance monitoring unit 213. The group A and the group B are included in both the system range information 500 and the range update information. The range of the group A is widened from the range of 1 to 1000 to the range of 1 to 1500 when the range column 502 of the system range information 500 and the new range column of the range update information are compared with each other. Therefore, it is determined that the group A is the rebalancing destination group. Similarly, it is determined that the group B is the rebalancing source group since the range of the group B is narrowed from the range of 1001 to 1700 to the range of 1501 to 1700. The node 110 including each group is determined from the configuration information 400. Therefore, it is determined that the rebalancing source nodes 110 are node 1 and node 3 and the rebalancing destination nodes 110 are node 1 and node 2.

Then, the moving group which takes charge of a blank range is created in the rebalancing source node 110 as a preparatory step to the group division operation (Step S103).

For example, in the case of FIG. 3(b), the rebalancing instruction unit 212 requests the configuration information management unit 211 to create the moving group D that takes charge of a blank range in node 1 and node 3 which are the rebalancing source nodes 110.

Specifically, when receiving the request, the configuration information management unit 211 generates a unique group ID capable of identifying the moving group and transmits, to node 1 and node 3, the moving group creation instruction 831 including the generated group ID and the group information 600 having the ID of node 1 and the ID of node 3. When the node 110 receives the moving group creation instruction 831, the instruction unit 140 of the node 110 adds a record related to the moving group D to the node range information 506, using the group ID and the group information 600 included in the moving group creation instruction 831, to create the processes 170 belonging to the moving group D. The instruction unit 140 which has created the processes 170 belonging to the moving group D transmits the moving group creation completion response 881 to the configuration information management unit 211. When receiving the moving group creation completion response 881 from both node 1 and node 3, the configuration information management unit 211 adds the moving group D to the group information column 403 of the record related to node 1 and node 3 in the configuration information 400, adds a record related to the moving group D to the system range information 500, and notifies the rebalancing instruction unit 212 that the moving group has been created. In addition, the first process 170 belonging to the moving group may be created using the moving group creation instruction 831 and the second or subsequent and subsequent processes 170 belonging to the moving group may be created using in-group process copying which will be described below.

Then, the range update instruction 801 to perform the range update process between the rebalancing source group and the moving group is created in order to perform the group division operation and is then transmitted to the rebalancing source node 110 (Step S104).

For example, in the case of FIG. 3(c), as described in Step S101, the rebalancing instruction 1000 is input such that the group B which has taken charge of the range of 1001 to 1700 takes charge of the range of 1501 to 1700. The moving group D is moved to the range of 1001 to 1500. Then, the rebalancing instruction unit 212 creates the range update instruction 801 including range update information having a record of a group ID column "group B" and a new range column "1501 to 1700" and a record of a group ID column "group D" and a new range column "1001 to 1500" and transmits the range update instruction 801 to node 1 and node 3 which are the rebalancing source nodes 110. Then, when receiving the range update completion response 851 one or more times from the rebalancing source node 110 to which the range update instruction 801 has been transmitted, the rebalancing instruction unit 212 updates the system range information 500 and ends the group division operation.

The range update process of the node 110 will be described in detail with reference to FIG. 10 and the subsequent drawings.

Then, it is determined whether the node 110 which does not include the process 170 belonging to the moving group is present among the rebalancing destination nodes 110 as a preparatory step to the group combination operation (Step S105). When the node 110 is present, the in-group process copying, which will be described, is performed.

For example, in the case of FIG. 3(d), it is determined that node 2, which is the rebalancing destination node 110, does not include the process 170 belonging to the moving group D from the configuration information 400. Therefore, the in-group process copying, which will be described below, from node 3 to node 2 is performed. When the in-group process copying ends, the moving group D is added to the group information column 403 of the record related to node 2 in the configuration information 400.

Then, the rebalancing instruction unit 212 searches for a node 110, which includes the process 170 belonging to the moving group, except for the rebalancing destination node 110 as a preparatory step to the group combination operation and performs the in-group process deletion for the node 110 (Step S106).

For example, in the case of FIG. 3(d), it is determined that node 3, which is not the rebalancing destination node 110, does not include the process 170 belonging to the moving group D from the configuration information 400. Therefore, the in-group process deletion is performed for the process 170, using the configuration information management unit 211.

Specifically, when receiving an in-group process deletion request, the configuration information management unit 211 transmits the in-group process deletion instruction 832 having the ID of the moving group D to node 3. When node 3 receives the in-group process deletion instruction 832, the instruction unit 140 of node 3 deletes the record related to the moving group D from the node range information 506 and deletes the processes 170 belonging to the moving group D, on the basis of the group ID included in the in-group process deletion instruction 832. The instruction unit 140 which has deleted the processes 170 belonging to the moving group D transmits the in-group process deletion completion response 882 to the configuration information management unit 211. When receiving the in-group process deletion completion response 882 from node 3, the configuration information management unit 211 deletes the moving group D from the group information column 403 of the record related to node 3 in the configuration information 400 and notifies the rebalancing instruction unit 212 that the in-group process deletion has been performed.

Then, in order to perform the group combination operation, the rebalancing instruction unit 212 creates the range update instruction 801 to perform the range update process between the moving group and the rebalancing destination group and transmits the range update instruction 801 to the rebalancing destination node 110 (Step S107).

For example, in the case of FIG. 3(d), in Step S101, the rebalancing instruction 1000 is input such that the group A which has taken charge of the range of 1 to 1000 takes charge of the range of 1 to 1500. Therefore, the group A is moved to the range of 1001 to 1500. The rebalancing instruction unit 212 creates the range update instruction 801 including range update information having a recode of a group ID column "group A" and a new range column "1 to 1500" and a record of a group ID column "group D" and a new range column "blank range" and transmits the range update instruction 801 to node 1 and node 2 which are the rebalancing destination nodes 110. Then, when receiving the range update completion response 851 one or more times from the rebalancing destination node 110 to which the range update instruction 801 has been transmitted, the rebalancing instruction unit 212 updates the system range information 500 and ends the group combination operation.

Finally, the rebalancing instruction unit 212 deletes an unnecessary moving group (Step S108).

For example, in the case of FIG. 3(e), node 1 and node 2 which are the rebalancing destination nodes 110 include the processes 170 belonging to the moving group D. Therefore, the rebalancing instruction unit 212 requests the configuration information management unit 211 to delete the moving group D.

Specifically, when receiving the request, the configuration information management unit 211 transmits the moving group deletion instruction 833 having the ID of the moving group D to node 1 and node 2. When node 1 and node 3 receive the moving group deletion instruction 833, the instruction unit 140 of node 1 and node 3 deletes the record related to the moving group D from the node range information 506 and deletes the processes 170 belonging to the moving group D, on the basis of the group ID included in the moving group deletion instruction 833. The instruction unit 140 which has deleted the processes 170 belonging to the moving group D transmits the moving group deletion completion response 883 to the configuration information management unit 211. When receiving the moving group deletion completion response 883 from both node 1 and node 2, the configuration information management unit 211 deletes the moving group D from the group information column 403 of the record related to node 1 and node 2 in the configuration information 400, deletes the record related to the moving group D from the system range information 500, and notifies the rebalancing instruction unit 212 that the moving group has been deleted. In addition, the in-group process deletion may be performed until only one process 170 remains in the moving group D and the last processes 170 may be deleted using the moving group deletion instruction 833.

As such, components related to the range update process, such as the distribution unit 130 and the processes 170 belonging to the group to be subjected to the range update process are localized to the same node 110. According to this structure, even when network partition occurs, it is possible to change the range if the nodes 110 corresponding to a high quorum remain in the same network. Therefore, when network partition occurs, the possibility of the system being stopped is reduced, as compared to the case in which components are distributed.

For example, when the size of the structure illustrated in FIG. 3 increases such that there are 12 computer apparatuses 100 and 12 nodes 110 and data is quintuplexed, five processes 170 belong to each group and the quorum of each group is 3. Therefore, even when a network partition failure occurs, the range update process can be continued if three computer apparatuses 100 capable of performing the range update process are present in a small network after the network partition. The rebalancing process can also be continued if four computer apparatuses 100 capable of performing the rebalancing process are present in a small network after the network partition.

Next, the operation of the instruction unit 140 will be described.

The instruction unit 140 receives the range update instruction 801 from the instruction receiving unit 120.

The instruction unit 140 determines the movement destination process 170 and the movement source process 170 to which the range update telegram 901 will be transmitted, from the range update instruction 801, and creates the range update telegram 901.

For example, in the case of FIG. 3(b), the range update information included in the received range update instruction 801 has a record of a group ID column "group B" and a new range column "1501 to 1700" and a record of a group ID "group D" and a new range column "1001 to 1501". Therefore, it is determined that the movement source group to which the range update telegram 901 will be transmitted is the group B and the movement destination group is the group D, from the comparison with the range column 502 of the node range information 506. In this embodiment, since the number of processes 170 belonging to the same group on one node is less than 2, the movement destination process 170 and the movement destination process 170 are determined from the IDs of the movement destination group and the movement source group.

The instruction unit 140 transmits the created range update telegram 901 to the atomic delivery units 171 of the determined movement source process 170 and movement destination process 170. The transmitted range update telegram 901 is atomically delivered in each group including the processes 170.

In addition, the instruction unit 140 transmits the created range update telegram 901 and the group information 600 in the movement source process 170 (or the movement destination process 170) to the atomic delivery unit 131 of the distribution unit 130. The transmitted range update telegram 901 is atomically delivered to the atomic delivery unit 131 of the node 110 based on the transmitted group information 600. The movement source group and the movement destination group are localized to the same node for the range update process. Since the group information 600 in the movement source process 170 and the group information 600 in the movement destination process 170 have the same content, the instruction unit 140 may transmit any group information 600 to the atomic delivery unit 131 of the distribution unit 130.

Finally, the instruction unit 140 transmits the range update completion response 851 to the rebalancing instruction unit 212 when detecting that the telegram execution unit 173 of the movement source process 170 in the same node 110 has updated the process range information 505 on the basis of the range update telegram 901, the telegram execution unit 173 of the movement destination process 170 in the same node 110 has updated the process range information 505 on the basis of the range update telegram 901, and the node range information update unit 133 in the same node 110 has updated the node range information 506 on the basis of the range update telegram 901.

Next, the operation of the distribution unit 130 will be described.

The distribution unit 130 receives the data update instruction 802 from the instruction receiving unit 120.

When receiving the data update instruction 802, the distribution unit 130 creates the data update telegram 902, specifies the group to which the data update telegram 902 will be transmitted, on the basis of the node range information 506, and transmits the data update telegram 902 to the atomic delivery unit 171 of the process 170 belonging to the specified group.

For example, in the case of FIG. 3(a), the node range information 506 of node 1 is stored in the record related to the group A and the group B in the system range information 500 illustrated in FIG. 5 since node 1 includes the group A and the group B. When the hash value of the key of the data which is included in the data update instruction 802 received by node 1 is 1300, it is determined that a group capable of executing the data update instruction 802 is the group B from the node range information 506. Therefore, the distribution unit 130 creates the data update telegram 902 from the data update instruction 802 and transmits the created data update telegram 902 to the atomic delivery units 171 of the processes 170 belonging to the group in the same node 110.

Finally, when detecting that the telegram execution unit 173 of the process 170, to which the data update telegram 902 has been transmitted, has updated the data storage unit 700 on the basis of the data update telegram 902, the distribution unit 130 transmits the data update completion response 852 to the client information management unit 312 which has transmitted the data update instruction 802.

Figure 10:
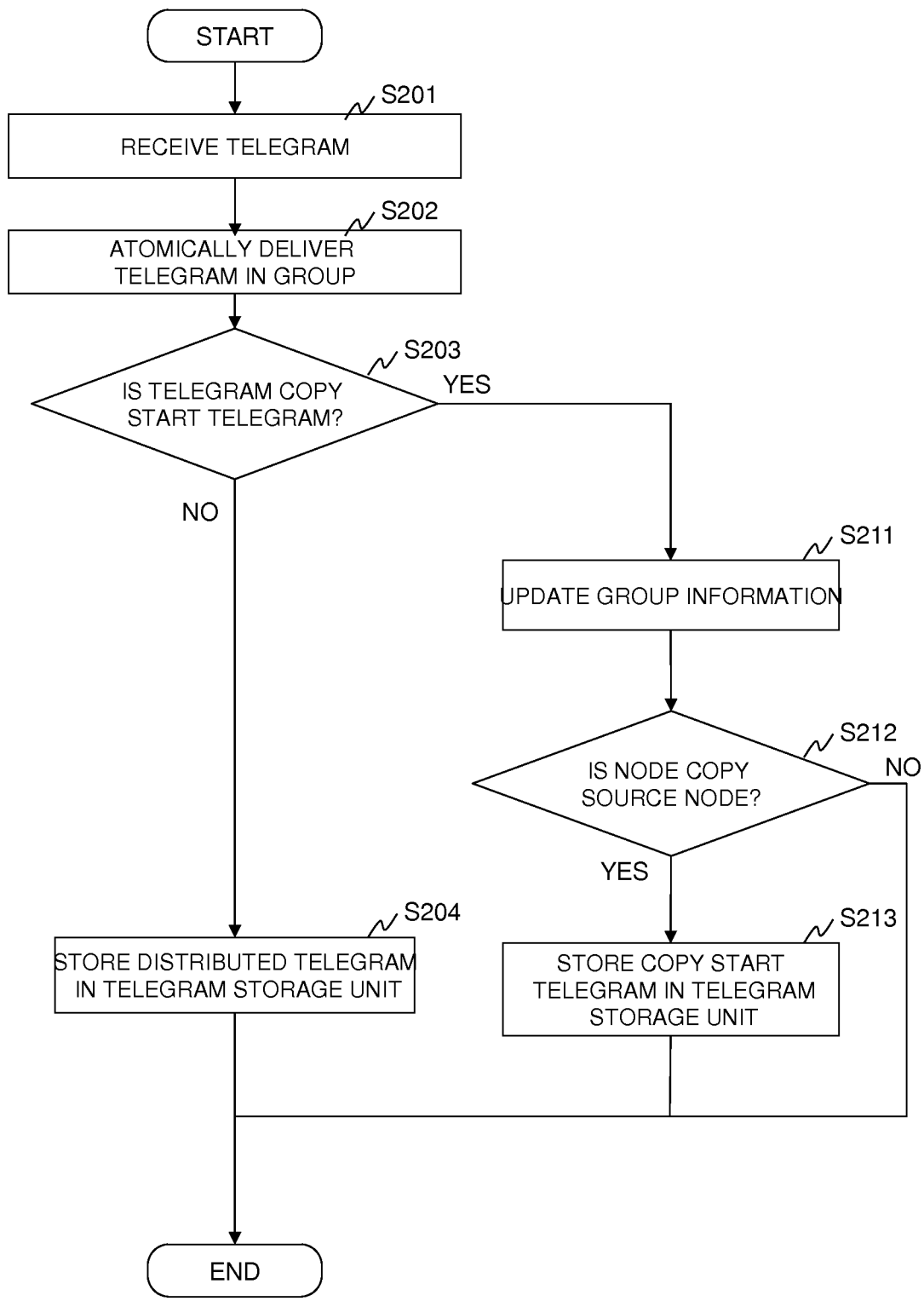
FIG. 10 is a flowchart illustrating the process of an atomic delivery unit according to Embodiment 1.

FIG. 10 is a flowchart illustrating the process of the atomic delivery unit 171 according to Embodiment 1 will be described.

First, the atomic delivery unit 171 receives the telegram 900 from the distribution unit 130, the instruction unit 140, or the copy unit 160 (Step S201).

Then, the atomic delivery unit 171 atomically delivers the received telegram 900 in the processes 170 belonging to the same group on the basis of the group information 600 (Step S202).

For example, in the case of FIG. 3(a), the atomic delivery unit 171 of the process 170 belonging to the group A in node 1 and the atomic delivery unit 171 of the process 170 belonging to the group A in node 2 are included in the same group A. The telegram 900 received by any of the atomic delivery units 171 is atomically delivered to each of the atomic delivery units 171. The same telegram 900 is distributed to each atomic delivery unit 171 in the same order.

The process after Step S203 is also performed by the atomic delivery unit 171 which has received the telegram 900 atomically delivered from other atomic delivery units 171, in addition to the atomic delivery unit 171 which has performed Step S201.

First, it is determined whether the atomically delivered telegram 900 is the copy start telegram 911 (Step S203). Here, since Step S211, Step S212, and Step S213 which are performed when the telegram 900 is the copy start telegram 911 are used in the in-group process copying, they will be described below.

When the telegram 900 is not the copy start telegram 911, the telegram 900 is stored in the telegram storage unit 172 (Step S204).

The operation of the atomic delivery unit 131 is the same as the operation of the atomic delivery unit 171 except that the atomic delivery unit 131 uses the group information 600 which is transmitted from the distribution unit 130 together with the telegram 900 and stores the atomically delivered telegram 900 in the telegram storage unit 132.

Figure 11:
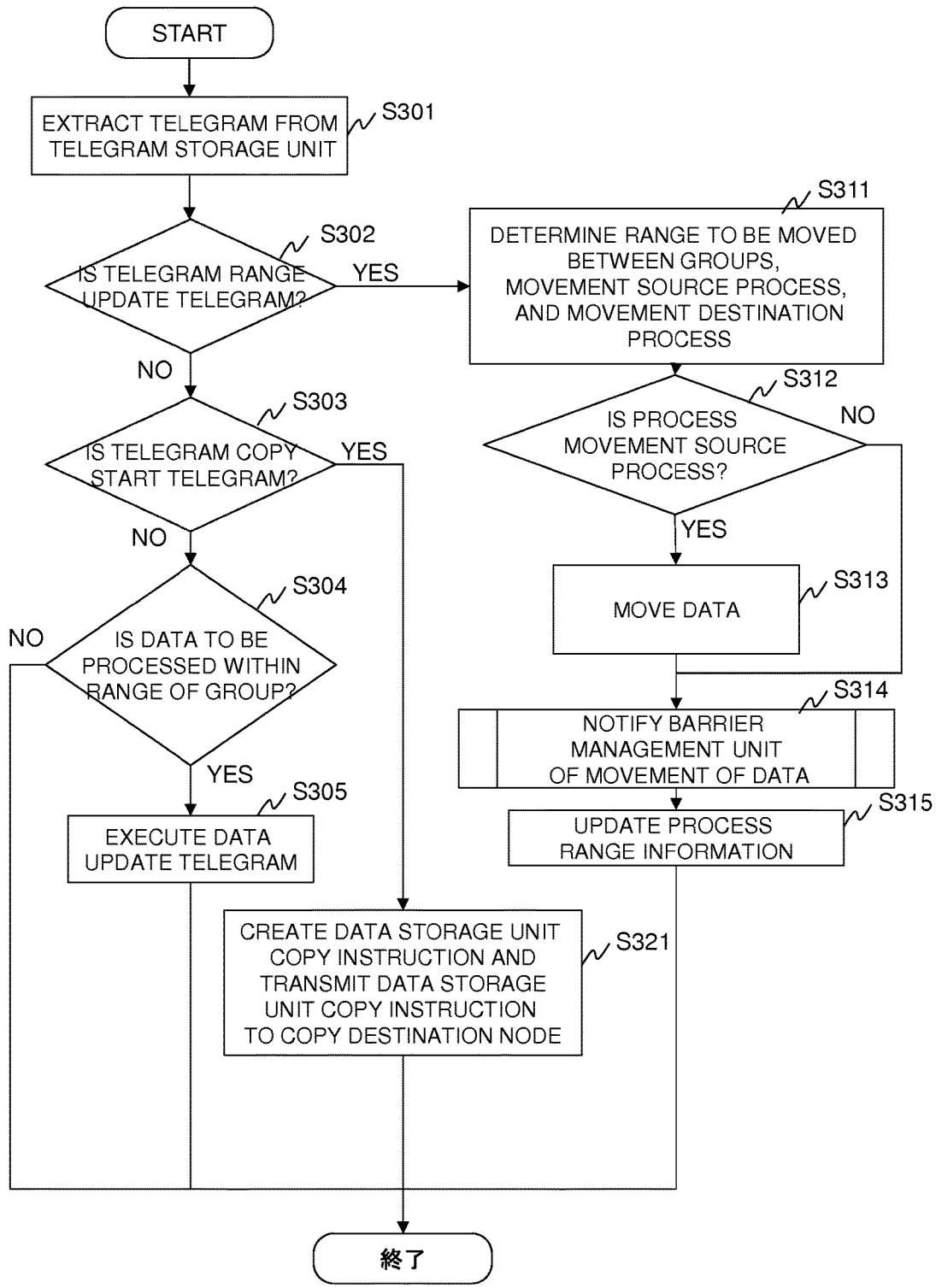
FIG. 11 is a flowchart illustrating the process of a telegram execution unit according to Embodiment 1.

FIG. 11 is a flowchart illustrating the process of the telegram execution unit 173 according to Embodiment 1. The process illustrated in the flowchart is performed whenever, for example, the atomic delivery unit 171 stores the telegram 900 in the telegram storage unit 172.

First, the telegram execution unit 173 extracts the telegram 900 stored in the telegram storage unit 172 (Step S301).

Then, the telegram execution unit 173 determines whether the extracted telegram 900 is the range update telegram 901 (Step S302).

When the extracted telegram 900 is not the range update telegram 901, the telegram execution unit 173 determines whether the extracted telegram 900 is the copy start telegram 911 (Step S303).

When the extracted telegram 900 is not the copy start telegram 911, the extracted telegram 900 is the data update telegram 902 and the telegram execution unit 173 determines whether the data to be processed which is included in the data update telegram 902 is within the range of the group, on the basis of the process range information 505 (Step S304).

When the data is within the range of the group, the telegram execution unit 173 performs the update process included in the data update telegram 902 (Step S305) and does not perform any other processes.

For example, in FIG. 3(a), when the hash value of the key of the data which is included in the data update telegram 902 extracted by the telegram execution unit 173 of the process 170 belonging to the group B is 1300, the range of the group B in the process range information 505 of the process 170 is from 1001 to 1700. Therefore, the telegram execution unit 173 performs the update process included in the data update telegram 902.

Step S321 which is performed when the extracted telegram 900 is the copy start telegram 911 in Step S303 is used in the in-group process copying and will be described below.

Finally, when it is determined in Step S302 that the extracted telegram 900 is the copy start telegram 911, the process range information 505 of the process 170 is compared with the range update information included in the range update telegram 901 and the range which is moved between the groups, the movement destination process 170, and the movement source process 170 are determined from the amount of change in the range before and after the range update process (Step S311).

For example, when the group division operation is performed in FIG. 3(*b*), the range update information included in the range update telegram 901 has a record of a group ID column "group B" and a new range column "1501 to 1700" and a record of a group ID column "group D" and a new range column "1001 to 1501". In addition, the process range information 505 of the process 170 belonging to the group B has a record related to the group B in the system range information 500 illustrated in FIG. 5. The process range information 505 of the process 170 belonging to the group D has a record of a group ID column 501 "group D" and a range column 502 "blank range". The telegram execution unit 173 of the process 170 belonging to the group B determines that the movement source group is the group B, the movement destination group is the group D, and the movement range is from 1001 to 1500, on the basis of the process range information 505 and the range update information, since the range β of the group B is narrowed from the range of 1001 to 1700 to the range of 1501 to 1700. In addition, the telegram execution unit 173 of the process 170 belonging to the group D determines that the movement destination group is the group D, the movement source group is the group B, and the movement range is from 1001 to 1500, on the basis of the process range information 505 and the range update information, since the range is widened from "–" to the range of 1001 to 1500. Then, when the movement source group and the movement destination group are determined, the movement source process 170 and the movement destination process 170 are also determined since the number of processes 170 belonging to the same group in one node is less than 2 in this embodiment.

Then, the telegram execution unit 173 determines whether the process 170 is the movement source process 170 (Step S312).

When the process 170 is the movement source process 170, data which is included in the movement range is moved from the data storage unit 700 of the process 170 to the data storage unit 700 of the movement destination process 170 in the same node 110 (Step S313).

For example, in the case of node 1 illustrated in FIG. 3(*b*), since two data items are included in the movement range of 1001 to 1500, the telegram execution unit 173 of the movement source process 170 belonging to the group B moves the data to the data storage unit 700 of the movement destination process 170 belonging to the group D in node 1. The same process as that for node 1 is performed between the movement destination process 170 in node 3 and the movement source process 170 independently of node 1.

Then, the telegram execution unit 173 notifies the barrier management unit 150 of the movement of the data (Step S314). The operation of the barrier management unit 150 will be described with reference to FIG. 12.

Finally, the telegram execution unit 173 updates the range column 502 of the record related to the group which is included in the process range information 505 of the process 170 to a new range, on the basis of the range update information included in the range update telegram 901 (Step S315).

As described above, the distribution unit 130 distributes the data update telegram 902 to the group on the basis of the node range information 506 of the distribution unit 130 and the process 170 belonging to the group to which the data update telegram 902 is distributed executes the data update telegram 902 on the basis of the process range information 505 of the process 170. Therefore, even when the distribution unit 130 does not atomically deliver the range update telegram 901 in time and distributes the data update telegram 902 to the process 170 belonging to a wrong group on the basis of the old range, the process 170 which executes the data update telegram 902 determines whether to perform the update process on the basis of new process range information 505. Therefore, data consistency can be guaranteed. In addition, the atomic delivery unit 171 and the atomic delivery unit 131 can determine the distribution order of the telegram 900 on the basis of a response to the quorum. Therefore, it is possible to prevent the system from being stopped due to the non-notification of information to some servers.

Figure 12:
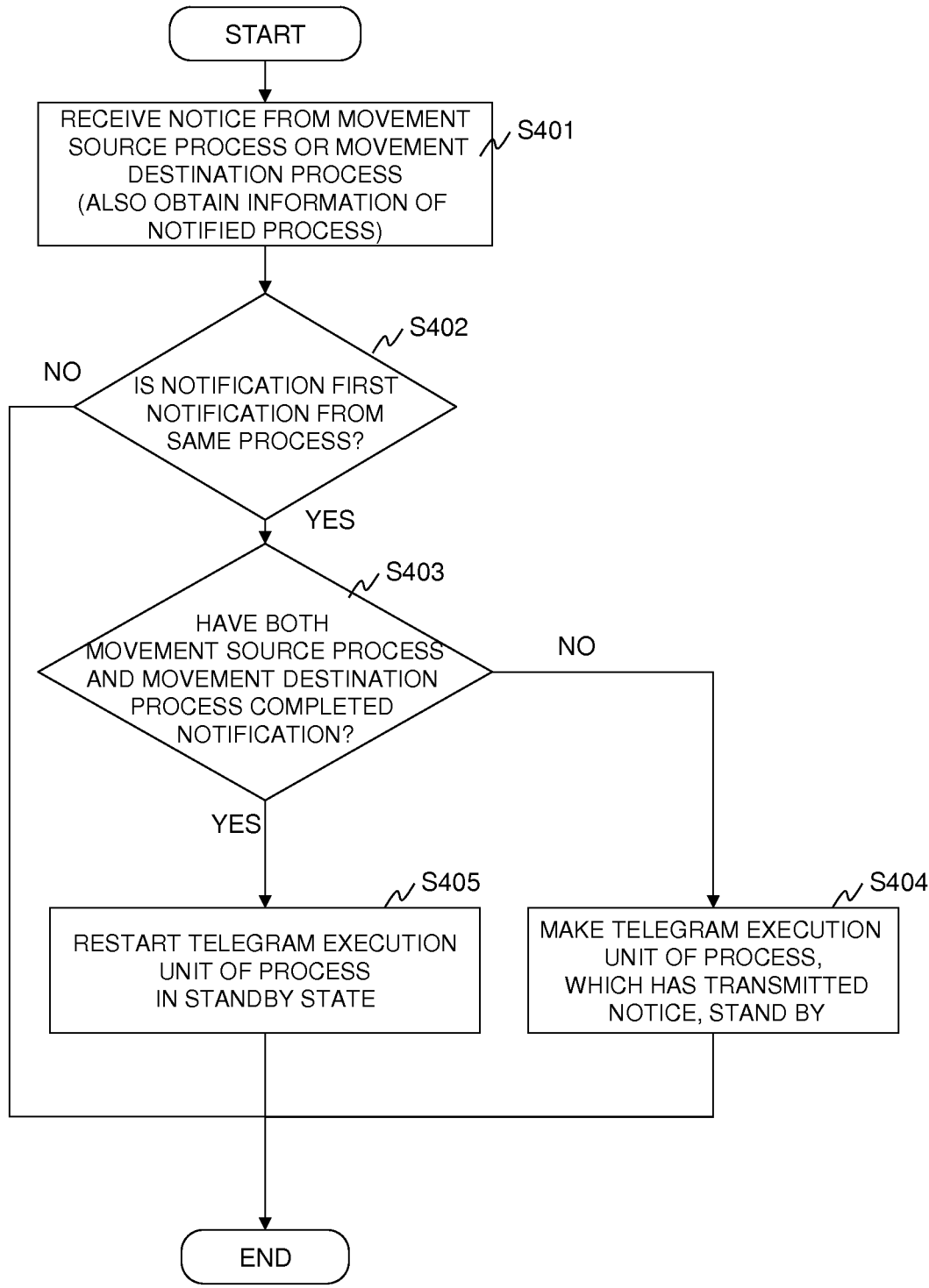
FIG. 12 is a flowchart illustrating the process of a barrier management unit according to Embodiment 1.

FIG. 12 is a flowchart illustrating the process of the barrier management unit 150 according to Embodiment 1.

First, the rebalancing instruction unit 212 creates a barrier ID unique to the system when creating the range update instruction 801 in Step S104 and Step S107. Then, the rebalancing instruction unit 212 inserts the barrier ID into the range update instruction 801 and the range update telegram 901.

Notified process information 151 which is stored in the barrier management unit 150 is a table storing a plurality of records, each of which is a pair of the barrier ID and the group ID. The record which is a pair of the barrier ID and the group ID is referred to as a notified process record.

The barrier management unit 150 receives the notice from the telegram execution unit 173 of the movement destination process 170 or the movement source process 170 in the node 110 (Step S401). At the time, the barrier management unit 150 receives the barrier ID and the IDs of the group, the movement source group, and the movement destination group from the telegram execution unit 173 which has transmitted the notice.

The barrier management unit 150 which has received the notice determines whether the telegram execution unit 173 transmits the notice first (Step S402). When the notification is the first notification, the barrier management unit 150 performs Step S403. When the notification is the second or subsequent notification, the barrier management unit 150 ends the process without performing any other processes.

Specifically, the barrier management unit 150 creates a notified process record from the barrier ID and the ID of the group received from the telegram execution unit 173 which has transmitted the notice and determines whether the same record as the above-mentioned record is included in the notified process information 151. When the same record is not included in the telegram execution unit 173, the barrier management unit 150 determines that the notification is the first notification. When it is determined that the notification is the first notification, the barrier management unit 150 adds the record to the notified process information 151.

When the notification is the first notification, the barrier management unit 150 determines whether both the movement destination process 170 and the movement source process 170 have transmitted the notice to the barrier management unit 150 on the basis of the current notification (Step S403).

Specifically, the barrier management unit 150 creates the notified process record of the movement source process 170 from the barrier ID and the ID of the movement source group and creates the notified process record of the movement destination process 170 from the barrier ID and the ID of the movement destination group, using the barrier ID, the ID of the movement source group, and the ID of the movement destination group received from the telegram execution unit 173 which has transmitted the notice. Then, the barrier management unit 150 determines whether both the same record as the notified process record of the movement destination process 170 and the same record as the notified process record of the movement source process 170 are included in the notified process information 151. When the two records are included in the notified process information 151, the barrier management unit 150 determines that both the movement destination process 170 and the movement source process 170 have completed the notification.

When it is determined that both the movement destination process 170 and the movement source process 170 have not completed the notification in the current notification process, the telegram execution unit 173 which has performed the current notification process is in a standby state (Step S404).

When it is determined that both the movement destination process 170 and the movement source process 170 have completed the notification in the current notification process, the barrier management unit 150 restarts the telegram execution unit 173 which is in the standby state in Step S404 (Step S405).

For example, in the case of node 1 illustrated in FIG. 3(*b*), when the telegram execution unit 173 of the movement destination process 170 belonging to the group D transmits the notice to the barrier management unit 150 first, the telegram execution unit 173 of the movement destination process 170 is in a standby state in Step S404 since the notified process record of the movement source process 170 belonging to the group B is not included in the notified process information 151. Thereafter, when the telegram execution unit 173 of the movement source process 170 also transmits the notice to the barrier management unit 150, the telegram execution unit 173 of the movement destination process 170 in the standby state is restarted since the notified process records of the movement destination process 170 and the movement source process 170 are included in the notified process information 151. The same process as that in node 1 is performed in the barrier management unit 150 in node 3, independently of node 1.

As described above, the telegram execution unit 173 of the movement destination process 170 and the telegram execution unit 173 of the movement source process 170 are met until they are joined in the barrier management unit 150. The telegram execution unit 173 of the movement destination process 170 can execute the data update telegram 902 stored in the telegram storage unit 172 after the telegram execution unit 173 of the movement source process 170 performs Step S313 (data included in the movement range is moved).

In this way, an update process in which data consistency and non-stop properties are ensured is performed.

Next, an example of the in-group process copying will be described.

The in-group process copying is performed as follows:

1. The copy destination node 110 creates a copy destination process 170 having an empty data storage unit 700;

2. The ID of the copy destination node 110 is added to the group information 600 of the process 170 belonging to an old group;

3. The group information 600 of the copy destination process 170 is updated to new group information;

4. The copy source process 170 executes all of the data update telegrams 902 stored in the telegram storage unit 172 immediately before the ID of the copy destination node 110 is added to the group information 600;

5. The copy source process 170 transmits all of the data stored in the data storage unit 700 to the copy destination process 170;

6. The copy destination process 170 copies all of the received data to the data storage unit 700; and 7. The copy destination process 170 starts the extraction of the telegram 900 stored in the telegram storage unit 172.

The process of each component will be described in detail below.

Step S111, Step S112, Step S113, and Step S114 in FIG. 9 are steps of the flowchart which illustrates an operation which the rebalancing instruction unit 212 according to Embodiment 1 performs the in-group process copying.

The rebalancing instruction unit 212 transmits the in-group process copy preparation instruction 811 to the copy destination node 110 (Step S111).

Then, the rebalancing instruction unit 212 receives the in-group process copy preparation completion response 861 from the copy destination node 110 (Step S112).

The rebalancing instruction unit 212 which has received the in-group process copy preparation completion response 861 from the copy destination node 110 transmits the in-group process copy execution instruction 812 to the copy source node 110 (Step S113).

Finally, the rebalancing instruction unit 212 receives the in-group process copy execution completion response 862 from the copy destination node 110 (Step S114).

Figure 13:
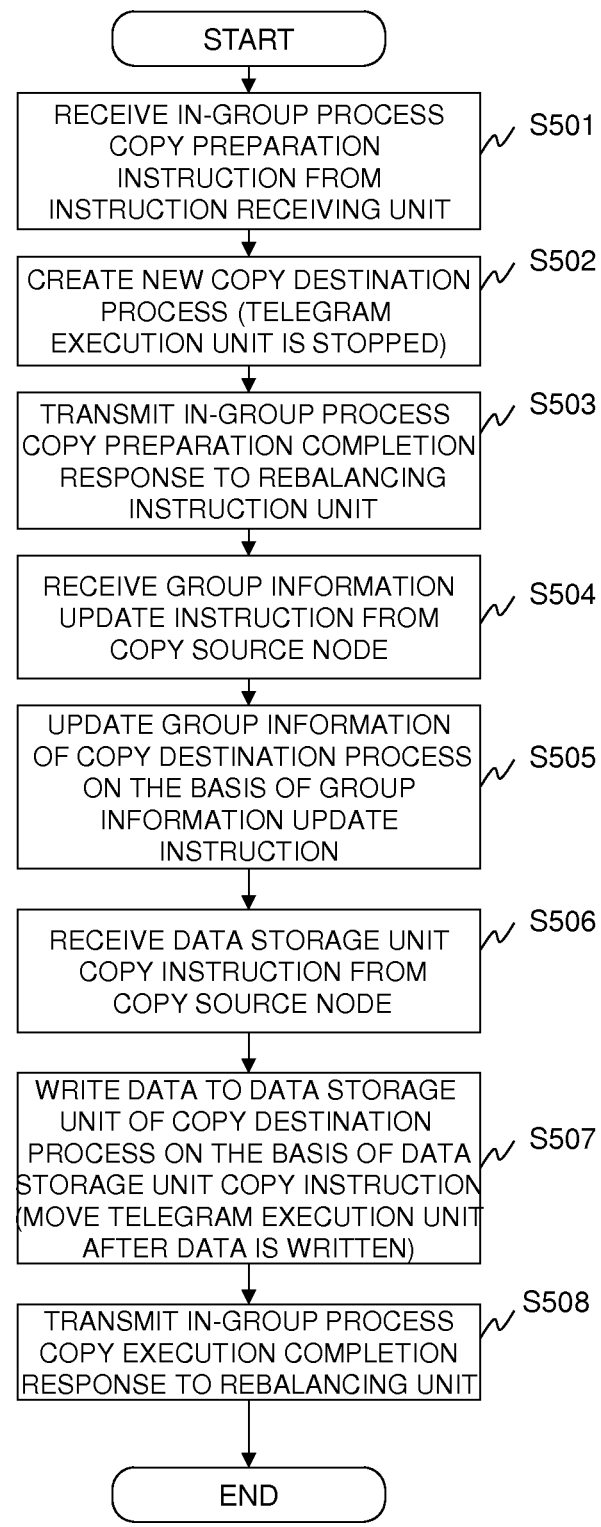
FIG. 13 is a flowchart illustrating the process of a copy unit in a copy destination node according to Embodiment 1.

FIG. 13 is a flowchart illustrating the process of the copy unit 160 in the copy destination node 110 according to Embodiment 1.

First, the copy unit 160 receives the in-group process copy preparation instruction 811 transmitted from the rebalancing instruction unit 212 through the instruction receiving unit 120 (Step S501).

The copy unit 160 which has received the in-group process copy preparation instruction 811 creates the copy destination process 170 on the basis of the ID of a copy target group from the in-group process copy preparation instruction 811 (Step S502). However, no data is included in the data storage unit 700 of the copy destination process 170 created at this point of time. In addition, it is assumed that the atomic delivery unit 171 of the copy destination process 170 does not belong to the copy target group at this point of time and the telegram execution unit 173 is stopped.

For example, in FIG. 3(*d*), the in-group process copy preparation instruction 811 is transmitted to the copy unit 160 of node 2, which is the copy destination node 110. Since the ID of the copy target group included in the in-group process copy preparation instruction 811 indicates the group D, the copy unit 160 of node 2 creates the copy destination process 170 belonging to the group D.

The copy unit 160 which has created the copy destination process 170 transmits the in-group process copy preparation completion response 861 to the rebalancing instruction unit 212 (Step S503).

Then, the copy unit 160 receives the group information update instruction 813 from the copy source node 110 (Step S504).

The copy unit 160 which has received the group information update instruction 813 from the copy source node 110 updates the group information 600 of the copy destination process 170 on the basis of new group information included in the group information update instruction 813 (Step S505).

The copy unit 160 receives the data storage unit copy instruction 814 from the copy source node 110 (Step S506).

The copy unit 160 which has received the data storage unit copy instruction 814 from the copy source node 110 writes data to the data storage unit 700 of the copy destination process 170 on the basis of information included in the data storage unit copy instruction 814 and operates the telegram execution unit 173 of the copy destination process 170 (Step S507).

Finally, the copy unit 160 transmits, to the rebalancing instruction unit 212, the in-group process copy execution completion response 862 indicating that the in-group process copying has ended (Step S508).

Figure 14:
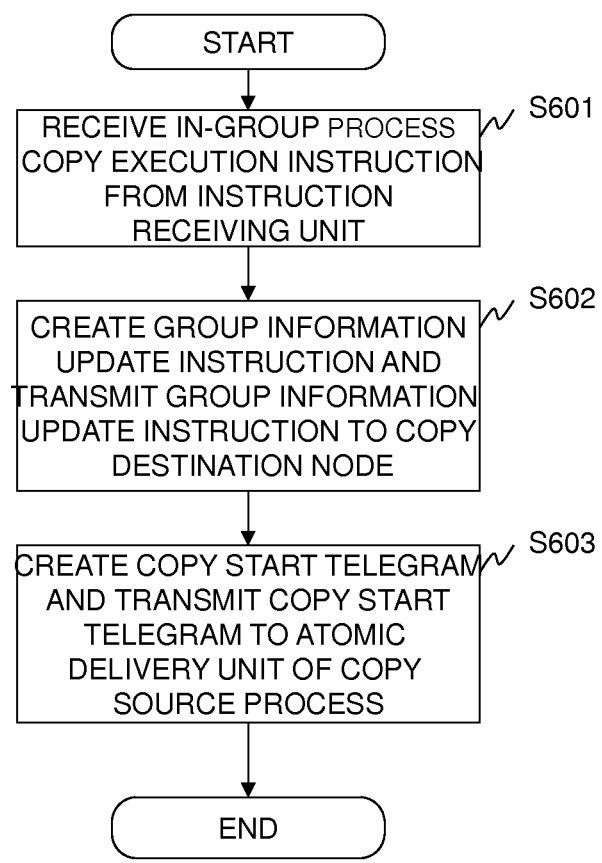
FIG. 14 is a flowchart illustrating the process of a copy unit in a copy source node according to Embodiment 1.

FIG. 14 is a flowchart illustrating the operation of the copy unit 160 in the copy source node 110 according to Embodiment 1.

First, the copy unit 160 receives the in-group process copy execution instruction 812 transmitted from the rebalancing instruction unit 212 (Step S601).

Then, the copy unit 160 determines the copy source process 170 from the ID of the copy target group included in the in-group process copy execution instruction 812 and adds the ID of the copy destination node 110 included in the in-group process copy execution instruction 812 to the group information 600 of the determined copy source process 170 to create new group information. Then, the copy unit 160 creates the group information update instruction 813 including the created new group information and transmits the group information update instruction 813 to the copy destination node 110 (Step S602).

In addition, the copy unit 160 creates the copy start telegram 911 from the new group information created in Step S602, the ID of the copy destination node 110 included in the in-group process copy execution instruction 812, and the ID of the node 110 and transmits the copy start telegram 911 to the atomic delivery unit 171 of the copy source process 170 (Step S603).

For example, in the case of FIG. 3(d), the copy unit 160 of node 3, which is the copy source node 110, receives the in-group process copy execution instruction 812. Information indicating that the copy destination node 110 is node 2 and information indicating that the copy target group is the group D are included in the in-group process copy execution instruction 812. Since the group information 600 of the copy source process 170 belonging to the group D indicates node 1 and node 3, the new group information has the IDs of a total of three nodes, that is, node 1, node 2, and node 3. Then, the copy unit 160 transmits the group information update instruction 813 including the new group information to node 2 which is the copy destination node 110. Then, the copy unit 160 creates the copy start telegram 911 including the ID of node 2 as the copy destination node 110, the ID of node 3 as the copy source node 110, and the new group information and transmits the copy start telegram 911 to the atomic delivery unit 171 of the copy source process 170 belonging to the group D.

Step S211, Step S212, and Step S213 in FIG. 10 are steps in the flowchart which illustrates an operation when the atomic delivery unit 171 performs the in-group process copying in Embodiment 1.

When receiving the copy start telegram 911, the atomic delivery unit 171 updates the group information 600 on the basis of the new group information included in the copy start telegram 911 (Step S211).

Then, the atomic delivery unit 171 determines whether the node 110 is the copy source node 110 on the basis of the ID of the copy source node 110 included in the copy start telegram 911 (Step S212).

When the node 110 is the copy source node 110, the atomic delivery unit 171 stores the copy start telegram 911 in the telegram storage unit 172 (Step S213). When the node 110 is not the copy source node 110, the atomic delivery unit 171 performs no process.

Step S321 in FIG. 11 is a step in the flowchart which illustrates an operation when the telegram execution unit 173 performs the copying of the process 170 in the group in Embodiment 1.

When it is determined in Step S303 that the telegram 900 extracted from the telegram storage unit 172 is the copy start telegram 911, the telegram execution unit 173 creates the data storage unit copy instruction 814 with reference to all of the data stored in the data storage unit 700 of the process 170 and transmits the created data storage unit copy instruction 814 to the copy destination node 110 on the basis of the ID of the copy destination node 110 included in the copy start telegram 911 (Step S321).

In this way, the copying of the process 170 in the group in which consistency and non-stop properties are ensured is performed.

In the description of this embodiment, since it is assumed that only one process 170 belongs to one group in one node 110, information about the process 170, such as an identifier (process ID) for identifying the process 170, is omitted. However, when two or more processes 170 belong to one group in one node 110, the configuration information 400 or the communication message includes, for example, a process ID or the number of processes and each node 110 has information (node configuration information) indicating which groups the processes 170 in the node 110 belong to.

Embodiment 2

In Embodiment 1, when the range update process is performed, the telegram execution unit 173 of the movement destination process 170 is in a standby state in Step S404 for the period from the execution of the range update telegram 901 by the telegram execution unit 173 of the movement destination process 170 to the execution of the range update telegram 901 by the telegram execution unit 173 of the movement source process 170.

Then, the telegram execution unit 173 of the movement destination process 170 can process the data update telegram 902 which is treated in the range before the range update process, without waiting until the telegram execution unit 173 of the movement source process 170 executes the range update telegram 901. However, when extracting the data update telegram 902 to be treated in the range after the range update process, the telegram execution unit 173 temporarily saves the data update telegram 902.

Then, the telegram execution unit 173 of the movement source process 170 which has executed the range update telegram 901 interrupts the telegram execution unit 173 of the movement destination process 170 in the same node 110. Then, similarly to Embodiment 1, the telegram execution unit 173 processes the data update telegram 902 in the range after the range update process.

Then, the interrupted telegram execution unit 173 of the movement destination process 170 extracts all of the data update telegrams 902 which have been temporarily saved and executes the extracted data update telegrams 902. Then, similarly to Embodiment 1, the telegram execution unit 173 processes the data update telegrams 902 in the range after the range update process.

In Embodiment 2, as an example of interruption, the telegram execution unit 173 of the movement source process 170 inputs the telegram saving opening telegram 921 to the telegram storage unit 172 of the movement destination process 170. However, an interruption mechanism which is provided by the computer apparatus 100 may be used.

Next, Embodiment 2 will be described with a focus on the difference between Embodiment 1 and Embodiment 2.

The telegram saving unit 180 and the saving process range information 181 illustrated in FIG. 2 are block diagrams which illustrate the details of a computer apparatus 100 according to Embodiment 2.

In the structure of a system according to Embodiment 2, a process 170 includes a telegram saving unit 180 that temporarily stores the data update telegram 902 and saving process range information 181 for determining the data update telegram 902 to be saved in the telegram saving unit 180. The telegram saving unit 180 is a queue that stores data in a first-in-first-out (FIFO) manner, similarly to the telegram storage unit 172. The initial value of the saving process range information 181 is a blank range.

A flowchart illustrating the process of a barrier management unit 150 according to Embodiment 2 will be described with a focus on the difference from the flowchart illustrated in FIG. 12.

First, when it is determined in Step S403 that both the movement destination process 170 and the movement source process 170 have not completed notification, the barrier management unit 150 does not perform Step S404 and determines whether the process 170 that has transmitted the notice to the barrier management unit 150 is the movement destination process 170.

When it is determined that the process 170 that has transmitted the notice to the barrier management unit 150 is the movement destination process 170, the barrier management unit 150 sets the difference between the ranges before and after a range update process for the movement destination process 170 to the saving process range information 181 of the movement destination process 170. On the other hand, when it is determined that the process 170 that has transmitted the notice to the barrier management unit 150 is the movement source process 170, the barrier management unit 150 performs no process.

Finally, when it is determined in Step S403 that both the movement destination process 170 and the movement source process 170 have completed the notification, the barrier management unit 150 does not perform Step S405 and determines whether the process 170 that has transmitted the notice to the barrier management unit 150 is the movement source process 170.

When it is determined that the process 170 that has transmitted the notice to the barrier management unit 150 is the movement source process 170, the barrier management unit 150 stores the telegram saving opening telegram 921 in the telegram storage unit 172 of the movement destination process 170. The telegram saving opening telegram 921 is an interrupt signal and is a telegram 900 that does not particularly include any data. On the other hand, when it is determined that the process 170 that has transmitted the notice to the barrier management unit 150 is the movement destination process 170, the barrier management unit 150 performs no process.

A flowchart that illustrates the process of the telegram execution unit 173 according to Embodiment 2 will be described with a focus on the difference from the flowchart illustrated in FIG. 11.

First, immediately before Step S302, the telegram execution unit 173 determines whether the telegram 900 extracted from the telegram storage unit 172 is the telegram saving opening telegram 921. When the extracted telegram 900 is the telegram saving opening telegram 921, the telegram execution unit 173 sets a blank range in the saving process range information 181, extracts all of the data update telegrams 902 stored in the telegram saving unit 180, executes the extracted data update telegrams 902, and ends the process. On the other hand, when the extracted telegram 900 is not the telegram saving opening telegram 921, the telegram execution unit 173 performs Step S302.

Finally, immediately before Step S305, the telegram execution unit 173 determines whether data to be processed, which is included in the data update telegram 902, is within the range included in the saving process range information 181 of the process 170. When the data is beyond the range, the telegram execution unit 173 performs Step S305, similarly to Embodiment 1. On the other hand, when the data is within the range, the telegram execution unit 173 stores the data update telegram 902 in the telegram saving unit 180 and ends the process, without performing Step S305.

According to this structure, the telegram execution unit 173 of the movement destination process 170 can execute the data update telegram 902 which is treated in an old range, without waiting until the telegram execution unit 173 of the movement source process 170 executes the range update telegram 901.

Various types of software described in this embodiment can be stored in various types of recording media (for example, non-transitory recording media), such as electromagnetic recording media, electronic recording media, and optical recording media, and can be downloaded to a computer through a communication network, such as the Internet.

The embodiments of the invention have been described in detail above with reference to the accompanying drawings. However, the invention is not limited to the embodiments. For example, the invention includes various modifications and equivalents structures within the scope and spirit of the appended claims.

The invention claimed is:

1. A computer system comprising:
a first processor and a first memory storing instructions that cause the first processor to execute one or more nodes which include: a plurality of processes that perform data processing, an instruction unit that designates key ranges of data to be processed by the processes, and a distribution unit that distributes the data to be processed to the processes,
wherein the nodes have a first process and a second process,
wherein the first processor further causes:
when data in a first key range is processed by the first process and when data in a second key range is processed by the second process and when a rebalancing instruction is received, the instruction unit of the nodes to transmit, to the first process, first range update information that includes information indicating a first updated key range obtained by removing a third key range from the first key range,
the instruction unit of the nodes to transmit, to the second process, second range update information that includes information indicating a second updated key range obtained by adding the third key range to the second key range,
the instruction unit of the nodes to transmit, to the distribution unit, third range update information that includes information indicating the first updated key range associated with the first process and the second updated key range associated with the second process, when receiving the third range update information, the distribution unit of the nodes to change the data to be distributed to the first process according to the first updated key range and to the second process according to the second updated key range, when receiving the first range update information, the first process to perform data processing on the data in the first updated key range, and when receiving the second range update information, the second process to perform data processing on the data in the second updated key range.

2. The computer system according to claim 1, wherein the plurality of nodes have a third process and a fourth process, wherein the first process and the third process form a first group and the second process and the fourth process form a second group, wherein the first processor further causes:

when the data in the first key range is processed by the first group and when data in the second key range is processed by the second group and when the rebalancing instruction is received, the instruction unit of the nodes to transmit, to the first group, the first range update information that includes information indicating the first updated key range obtained by removing the third key range from the first key range, the instruction unit of the nodes to transmit, to the second group, second range update information that includes information indicating a second updated key range obtained by adding the third key range to the second key range, the instruction unit of the nodes to transmit, to the distribution unit of the nodes, third range update information that includes information indicating the first updated key range associated with the first group and the second updated key range associated with the second group, when receiving the third range update information, the distribution unit of the nodes to change the data to be distributed to the first process according to the first updated key range and to the second process according to the second updated key range, when receiving the third range update information, the distribution unit of the nodes to change the data to be distributed to the third process according to the first updated key range and to the fourth process according to the second updated key range, when receiving the first range update information, the first group to perform data processing on the data in the first updated key range, and when receiving the second range update information, the second group to perform data processing on the data in the second updated key range.

3. The computer system according to claim 2, wherein the first processor is further caused to execute:

when the second process receives the second range update information and does not have a copy of related data required to process the data in the third key range, the second process requests at least the first process to transmit a copy of the related data corresponding to the data in the third key range, the first process transmits the related data requested by the second process to the second process, and the second process receives the related data from the first process and performs the data processing in the second updated key range.

4. The computer system according to claim 2, further comprising:

a rebalancing instruction computer including a second processor and a second memory storing instructions that cause the second processor to:

issue a key range change instruction when the amount of data processed is unbalanced between groups, transmit a range update instruction to change the key ranges to the instruction unit of the nodes, and wherein the first processor further causes:

the distribution unit of the nodes communicates with the distribution unit of the nodes to atomically deliver the range update information, and the process of the nodes atomically delivers the range update information to the first group with reference to group information.

5. The computer system according to claim 4, wherein the second processor further causes:

the rebalancing instruction unit to transmit the range update instruction to the plurality of nodes.

6. The computer system according to claim 3, wherein the second process includes a telegram saving unit, and wherein the first processor further causes:

the telegram saving unit to temporarily store the data to be processed in the third key range, the second process to store the data in the third key range in the telegram saving unit until the related data is received from the first process, and after the data to be processed in the third key range is received from the first process, the second process to perform data processing in the second updated key range.

7. A data processing method that is performed in a computer system that executes a plurality of nodes which include: a plurality of processes that perform data processing, an instruction unit that designates a key range of data processed by the processes, and a distribution unit that distributes data to be processed, and the nodes have a first process and a second process, the data processing method comprising:

when data in a first key range is processed by the first process and data in a second key range is processed by the second process, transmitting, by the instruction unit of the nodes, to the first process, first range update information that includes information indicating a first updated key range obtained by removing a third key range from the first key range;

transmitting, by the instruction unit of the nodes, to the second process, second range update information that includes information indicating a second updated key range obtained by adding the third key range to the second key range;

transmitting, by the instruction unit of the nodes, to the distribution unit, third range update information that includes information indicating the first updated key range associated with the first process and the second updated key range associated with the second process;

changing, by the distribution unit of the nodes, the range of data to be distributed to the first process according to the first updated key range and to the second process according to the second updated key range when the distribution unit receives the third range update information;

performing, by the first process, data processing in the first updated key range when the first process receives the first range update information; and performing, by the second process, data processing in the second updated key range when the second process receives the second range update information.

8. The data processing method according to claim 7, wherein the plurality of nodes have a third process and a fourth process, wherein the first process and the third process form a first group and the second process and the fourth process form a second group, and wherein, when data in the first key range is processed by the first group and data in the second key range is processed by the second group, transmitting, by the instruction unit of the nodes, to the first group, first range update information that includes information indicating a first updated key range obtained by removing a third key range from the first key range;

transmitting, by the instruction unit of the nodes, to the second group, second range update information that includes information indicating a second updated key range obtained by adding the third key range to the second key range;

transmitting, by the instruction unit of the nodes, to the distribution unit of the nodes, third range update information that includes information indicating the first updated key range associated with the first group and the second updated key range associated with the second group;

changing, by the distribution unit of the nodes, the range of data to be distributed to the first group according to the first updated key range and to the second group according to the second updated key range when the distribution unit receives the third range update information;

performing, by the first group, data processing in the first updated key range when the first group receives the first range update information; and performing, by the second group, data processing in the second updated key range when the second group receives the second range update information.

9. The data processing method according to claim 8, further comprising:

when the second process receives the second range update information and does not have a copy of related data required to process the data in the third key range, requesting, by the second process, at least the first process to transmit a copy of the related data corresponding to the data in the third key range, transmitting, by the first process, the related data requested by the second process to the second process, and receiving, by the second process, the related data from the first process and performing the data processing in the second updated key range.

10. The data processing method according to claim 8, wherein the computer system further includes a rebalancing instruction unit, the data processing method further comprising:

issuing, by the rebalancing instruction unit, a key range change instruction when the amount of data processed is unbalanced between groups, transmitting, by the rebalancing instruction unit, a range update instruction to change the key ranges to the instruction unit of the nodes, communicating, by the distribution unit of the nodes with the distribution unit of the nodes, to atomically deliver the range update information, and the first process of the nodes atomically delivers the range update information, which has been transmitted to the process, to the first group with reference to group information.

11. The data processing method according to claim 10, further comprising:

transmitting, by the rebalancing instruction unit, the range update instruction to the plurality of nodes.

12. The data processing method according to claim 9, wherein the second process includes a telegram saving unit, the data processing method further comprising:

temporarily storing, by the telegram saving unit, the data to be processed in the third key range, storing, by the second process, the data in the third key range in the telegram saving unit until the related data is received from the first process, and after the data to be processed in the third key range is received from the first process, performing, by the second process, the data processing in the second updated key range.

* * * * *